US010825224B2

(12) United States Patent
Heller et al.

(10) Patent No.: US 10,825,224 B2
(45) Date of Patent: Nov. 3, 2020

(54) AUTOMATIC VISEME DETECTION FOR GENERATING ANIMATABLE PUPPET

(71) Applicant: Adobe Inc., San Jose, CA (US)

(72) Inventors: Geoffrey Heller, Seattle, WA (US); Jakub Fiser, Seattle, WA (US); David P. Simons, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/196,680

(22) Filed: Nov. 20, 2018

(65) Prior Publication Data

US 2020/0160581 A1  May 21, 2020

(51) Int. Cl.
*G06K 9/00* (2006.01)
*G06T 13/40* (2011.01)

(52) U.S. Cl.
CPC .......... *G06T 13/40* (2013.01); *G06K 9/00268* (2013.01); *G06K 9/00335* (2013.01); *G06K 9/00744* (2013.01)

(58) Field of Classification Search
None
See application file for complete search history.

(56) References Cited

U.S. PATENT DOCUMENTS

| | | |
|---|---|---|
| 9,589,357 B2 | 3/2017 | Li et al. |
| 9,799,096 B1 | 10/2017 | De la Torre et al. |
| 9,996,981 B1 | 6/2018 | Tran et al. |
| 10,127,908 B1 * | 11/2018 | Deller ...................... G10L 15/30 |
| 10,489,959 B2 | 11/2019 | Simons et al. |
| 10,504,267 B2 | 12/2019 | Simons et al. |
| 2002/0097380 A1 * | 7/2002 | Moulton ................. G03B 31/00 352/5 |
| 2009/0132371 A1 * | 5/2009 | Strietzel ................. G06Q 30/02 705/14.46 |
| 2013/0129226 A1 | 5/2013 | Abe |
| 2014/0035929 A1 | 2/2014 | Matthews et al. |
| 2016/0071544 A1 | 3/2016 | Waterston et al. |
| 2018/0061009 A1 | 3/2018 | Gren et al. |

OTHER PUBLICATIONS

Rematas, Konstantlinos,et al., "Novel View of Objects From a Single Image", arXiv:1602.00328v2, Aug. 15, 2016, 14 pages.

(Continued)

*Primary Examiner* — Yanna Wu
(74) *Attorney, Agent, or Firm* — Kilpatrick Townsend & Stockton LLP

(57) ABSTRACT

Certain embodiments involve automatically detecting video frames that depict visemes and that are usable for generating an animatable puppet. For example, a computing device accesses video frames depicting a person performing gestures usable for generating a layered puppet, including a viseme gesture corresponding to a target sound or phoneme. The computing device determines that audio data including the target sound or phoneme aligns with a particular video frame from the video frames that depicts the person performing the viseme gesture. The computing device creates, from the video frames, a puppet animation of the gestures, including an animation of the viseme corresponding to the target sound or phoneme that is generated from the particular video frame. The computing device outputs the puppet animation to a presentation device.

20 Claims, 26 Drawing Sheets

(56) References Cited

OTHER PUBLICATIONS

Shih, Yichang, et al., "Style Transfer for Headshot Portraits", Association for Computing Machinery, Proceedings of ACM Siggraph 2014, vol. 33, Issue 4, Article 148, Jul. 2014, 14 pages.
Liu Sifei, et al., "Multi-Objective Convolutional Learning for Face Labeling", IEEEConfernce on Computer Vision and Pattern Recognition, Jun. 2015, 9 pages.
Fiser, Jakub, et al., "Color Me Noisy: Example-Based Rendering of Hand-Colored Animations with Temporal Noise Control", Computer Graphics Forum, vol. 33, Issue 4, Jul. 2014, 10 pages.
Adobe, "How to Make Mouth Animations", https://helpx.adobe.com/adobe-character-animator/how-to/lip-sync-mouth-shapes.html, Oct. 2017, accessed Nov. 20, 2018, 5 pages.
U.S. Appl. No. 15/784,415, Non-Final Office Action dated Jan. 29, 2019, 9 pages.
U.S. Appl. No. 15/784,415, Notice of Allowance dated Jun. 7, 2019, 12 pages.
U.S. Appl. No. 15/784,415, Notice of Allowance dated Jul. 30, 2019, 8 pages.
U.S. Appl. No. 15/786,558, Non-Final Office Action dated Feb. 12, 2019, 22 pages.
U.S. Appl. No. 15/786,558, Notice of Allowance dated Jul. 8, 2019, 9 pages.
U.S. Appl. No. 15/786,558, Supplemental Notice of Allowability dated Sep. 12, 2019, 5 pages.
U.S. Appl. No. 16/681,218 First Action Interview Pilot Program Pre-Interview Communication dated Apr. 10, 2020, 8 pages.
Benard et al., Stylizing Animation by Example, ACM Transactions on Graphics, vol. 32, No. 4, Article No. 119, Jul. 2013, pp. 119:1-119:11.
Berger, Style and Abstraction in Portrait Sketching, ACM Transactions on Graphics, vol. 32, No. 4, Article No. 55, May 2013, 63 pages.
Chen et al., Example-Based Automatic Portraiture, ACCV2002: The 5th Asian Conference on Computer Vision, Jan. 23-25, 2002, pp. 1-6.
Chen et al., Example-Based Composite Sketching of Human Portraits, In Proceedings of International Symposium on Non-Photorealistic Animation and Rendering, Jun. 2004, 8 pages.
Chen et al., PicToon: A Personalized Image-Based Cartoon System, In Proceedings of ACM International Conference on Multimedia, Dec. 2002, 8 pages.
Decarlo et al., Stylization and Abstraction of Photographs, ACM Transactions on Graphics vol. 21, No. 3, Jul. 2002, pp. 769-776.
Dipaola, Painterly Rendered Portraits from Photographs Using a Knowledge-Based Approach, In Proceedings of SPIE Human Vision and Electronic Imaging, vol. 6492, 2007, pp. 1-10.
Efros et al., "Image Quilting for Texture Synthesis and Transfer", In Proceedings of the 28th Annual Conference on Computer Graphics and Interactive Techniques, ACM, Aug. 12-17, 2001, 6 pages.
Fiser et al., Stylit: Illumination-Guided Example-Based Stylization of 3D Renderings, ACM Transactions on Graphics, vol. 36, No. 4, Article 155, Jul. 24-28, 2016, 11 pages.
Gatys et al., Image Style Transfer Using Convolution Neural Networks, IEEE Conference on Computer Vision and Pattern Recognition (CVPR), Jun. 27-30, 2016, pp. 2414-2423.
Gong et al., Detection of Regions Matching Specified Chromatic Features, Computer Vision and Image Understanding, vol. 61, No. 2, Mar. 1995, pp. 263-269 (abstract only).
Gooch et al., Human Facial Illustrations: Creation and Psychophysical Evaluation, ACM Transactions on Graphics, vol. 23, No. 1, Jan. 2004, pp. 27-44.
Grady, Random Walks for Image Segmentation, IEEE Transactions on Pattern Analysis and Machine Intelligence, vol. 28, No. 11, Nov. 2006, pp. 1-17.
Hays et al., Image and Video Based Painterly Animation, In Proceedings of International Symposium on Non-Photorealistic Animation and Rendering, Jun. 2004, 8 pages.
Hertzmann et al., Image Analogies, In Proceedings of the 28th Annual Conference on Computer Graphics and Interactive Techniques, ACM, Aug. 2001, 14 pages.
Jamrisk et al., LazyFluids: Appearance Transfer for Fluid Animations, ACM Transactions on Graphics, vol. 34, No. 4, Article No. 92, Aug. 2015, 10 pages.
Kazemi et al., One Millisecond Face Alignment with an Ensemble of Regression Trees, Computer Vision and Pattern Recognition (CVPR), 2014, 8 pages.
Kemelmacher, Transfiguring Portraits, ACM Transactions on Graphics vol. 35, No. 4, Jul. 24-28, 2016, 8 pages.
Kwatra et al., Texture Optimization for Example-Based Synthesis, ACM Transactions on Graphics, vol. 24, No. 3, 2005, pp. 795-802.
Kyprianidis et al., State of the 'Art': A Taxonomy of Artistic Stylization Techniques for Images and Video, IEEE Transactions on Visualization and Computer Graphics vol. 19, No. 5, 2012, 20 pages.
Levin et al., A Closed Form Solution to Natural Image Matting, IEEE Transactions on Pattern Analysis and Machine Intelligence, vol. 30, No. 2, Feb. 2008, 8 pages.
Li et al., Guided Face Cartoon Synthesis, IEEE Transactions on Multimedia, vol. 13, No. 6, Dec. 2011, pp. 1230-1239.
Liu et al., Sift Flow: Dense Correspondence Across Scenes and its Applications, IEEE Transactions on Pattern Analysis and Machine Intelligence, vol. 33, 2011, 17 pages.
Meng et al., Artistic Paper-Cut of Human Portraits, In Proceedings of ACM Multimedia, Oct. 25-29, 2010, 4 pages.
Newson et al., Video Inpainting of Complex Scenes, SIAM Journal of Imaging Science vol. 7, No. 4, 27 pages.
Noris et al., Temporal Noise Control for Sketchy Animation, In Proceedings of International Symposium on Non-Photorealistic Animation and Rendering, 6 pages.
Orzan et al., Diffusion Curves: A Vector Representation for Smooth-Shaded Images, SIGGRAPH '08, ACM Transactions on Graphics, vol. 27, Apr. 27, 2008, 8 pages.
Portilla et al., A Parametric Texture Model Based on Joint Statistics of Complex Wavelet Coefficients, International Journal of Computer Vision, vol. 40, No. 1, 2000, pp. 49-71.
Ruder et al., Artistic Style Transfer for Videos and Spherical Images, In Proceedings of German Conference Pattern Recognition, 21 pages.
Schaefer et al., Image Deformation Using Moving Least Squares, ACM Transactions on Graphics vol. 25, No. 3, 2006, 8 pages.
Selim et al., Painting Style Transfer for Head Portraits Using Convolutional Neural Networks, ACM Transactions on Graphics, vol. 35, No. 4, Article 129, Jul. 2016, 18 pages.
Shen et al., Automatic Portrait Segmentation for Image Stylization, In Computer Graphics Forum, vol. 35, No. 2, 2016, 10 pages.
Simonyan et al., Very Deep Convolutional Networks for Large-Scale Image Recognition, Published as a Conference paper at ICLR 2015, Proceedings of International Conference on Learning Representations, Apr. 10, 2015, 14 pages.
Sinha et al., Face Recognition by Humans: Nineteen Results All Computer Vision Researchers Should Know About, Proceedings of the IEEE, vol. 94, No. 11, Nov. 2006, pp. 1948-1962.
Tresset et al., Generative Portrait Sketching, Proceedings of the 11th International Conference on Virtual Systems and Multimedia, Oct. 2005, pp. 739-748.
Wang et al., A Comprehensive Survey to Face Hallucination, International Journal of Computer Vision vol. 106, No. 1, 2014, 24 pages.
Wang et al., Face Photo-Sketch Synthesis and Recognition, IEEE Transactions on Pattern Analysis and Machine Intelligence vol. 31, No. 11, Nov. 2009, pp. 1955-1967.
Wang et al., Learnable Stroke Models for Example-Based Portrait Painting, In Proceedings of British Machine Vision Conference, 2013, 11 pages.
Wang et al., Transductive Face Sketch-Photo Synthesis, IEEE Transactions on Neural Networks and Learning Systems, vol. 24, No. 9, Sep. 2013, pp. 1364-1376 (abstract only).
Wexler et al., Space-Time Completion of Video, IEEE Transactions on Pattern Analysis and Machine Intelligence, vol. 29, No. 3, Mar. 2007, 14 pages.

(56) References Cited

OTHER PUBLICATIONS

Winnemoeller et al., Real-Time Video Abstraction, ACM Transactions on Graphics vol. 25, No. 3, 2006, 6 pages.
Yang et al., Semantic Portrait Color Transfer with Internet Images, Multimedia Tools and Applications, vol. 76, No. 1, 2017, 7 pages (abstract only).
Yang et al., Semantics-Driven Portrait Cartoon Stylization, In Proceedings of 17th International Conference on Image Processing, Sep. 26-29, 2010, 4 pages.
Zeng et al., From Image Parsing to Painterly Rendering, ACM Transactions on Graphics vol. 29, No. 1, 2009, 17 pages.
Zhang et al., Data-Driven Face Cartoon Stylization, In SIGGRAPH Asia Technical Briefs, vol. 14, Dec. 3-6, 2014, 4 pages.
Zhao et al., Portrait Painting Using Active Templates, In Proceedings of International Symposium on Non-Photorealistic Animation and Rendering, 2011, 7 pages.
Zhou et al., Markov Weight Fields for Face Sketch Synthesis, In Proceedings of IEEE Conference on Computer Vision and Pattern Recognition, 2012, 7 pages.
Notice of Allowance from related U.S. Appl. No. 16/681,281 dated Jun. 18, 2020, 12 pages.

\* cited by examiner

AUTOMATIC VISEME DETECTION FOR GENERATING ANIMATABLE PUPPET

TECHNICAL FIELD

This disclosure generally relates to computer animation or computer graphics and more specifically relates to automatically detecting video frames that depict visemes and that are usable for generating an animatable puppet.

BACKGROUND

Computer animation methods and techniques can involve using computer graphics systems to generate one or more characters (e.g., rigged puppets for character animation). In some instances, a user manually creates the character using a computer graphics system. To do so, the user may be required to manually create each individual component, feature, layer, etc. of the character. For instance, the user may be required to manually create the character's nose, mouth, eyes, etc. Moreover, some existing computer graphics systems may require the user to manually modify the character to create an animated puppet. For instance, the user may be required to manually adjust the character's mouth to form various shapes or gestures that resemble the animated puppet making a sound (e.g., a sound that is a phoneme or phone of a particular word). Manually creating an animated character or manually modifying the animated character to create an animated puppet can require expertise, may be time consuming, or can cause the user to create an undesirable (e.g. aesthetically unpleasing) animated character or puppet.

One method of facilitating the animation of a puppet is to use frames extracted from a video recording of a person speaking certain words as the basis for animating a character that speaks the same words. For instance, certain computer graphics applications allow a user to automatically generate puppets based on his or her own facial features. Such a computer graphics application first captures images of the user performing specific sounds. These images are called "visemes," and can include, for example, images of mouth shapes associated with sounds such as "Ah," "Ee," "M," "Oh," etc. To do so, the computer graphics application separately prompts the user to perform each mouth shape and to press a key or otherwise indicate a point in time when the mouth shape has been performed. But this manual method is time-consuming, and may result in a lower-quality animation if a user has difficulty performing the requested viseme and pressing the indicator key.

SUMMARY

Certain embodiments involve automatically detecting video frames that depict visemes and that are usable for generating an animatable puppet. For example, a computing device accesses video frames depicting a person performing gestures usable for generating a layered puppet, including a viseme gesture corresponding to a target sound or phoneme. The computing device determines that audio data including the target sound or phoneme aligns with a particular video frame from the video frames that depicts the person performing the viseme gesture. The computing device creates, from the video frames, a puppet animation of the gestures, including an animation of the viseme corresponding to the target sound or phoneme that is generated from the particular video frame. The computing device outputs the puppet animation to a presentation device.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
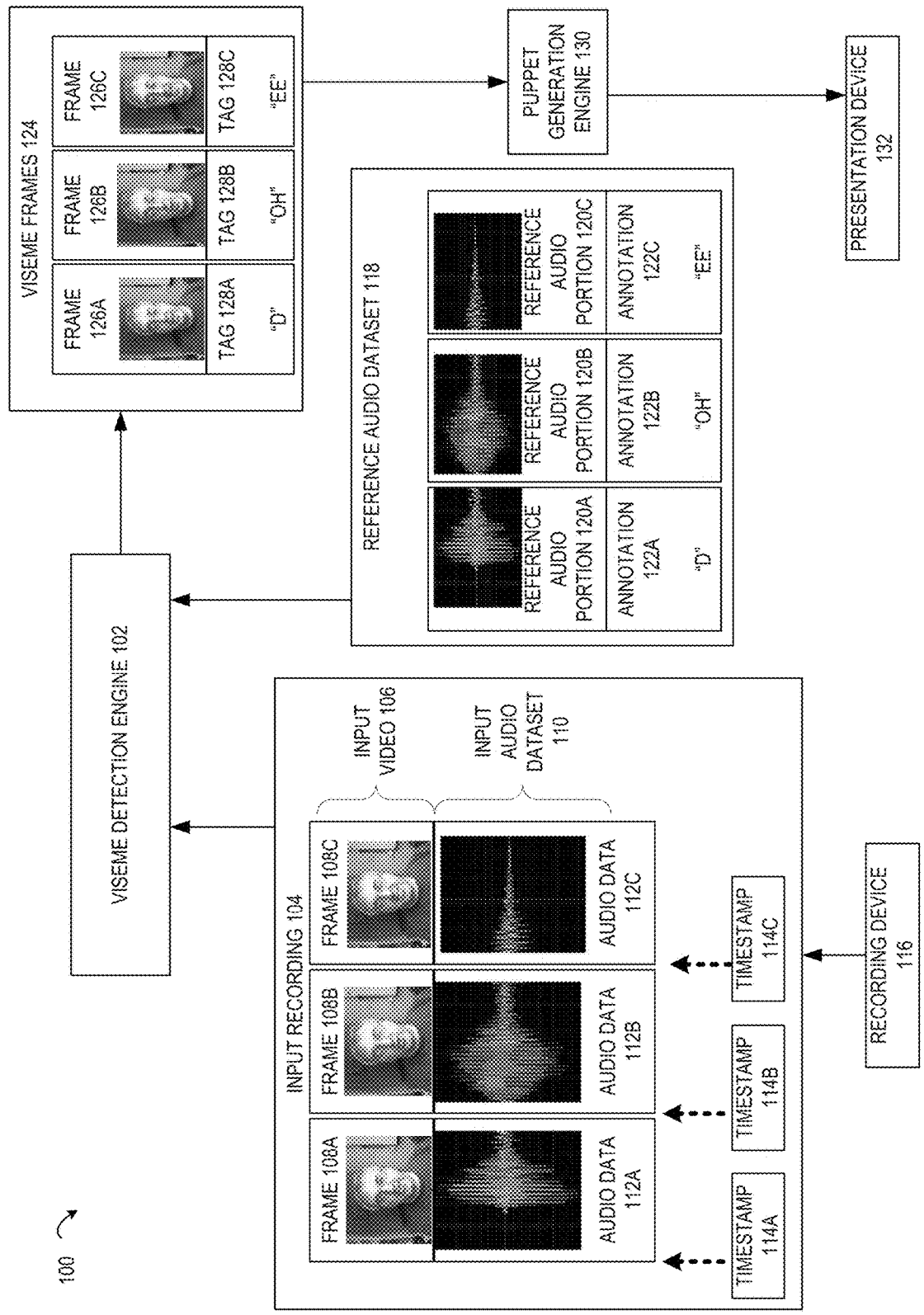
FIG. 1 depicts an example of a computing environment in which frames depicting certain visemes are automatically detected and used for generating an animatable puppet, in accordance with one or more embodiments.

Embodiments described herein involve automatically detecting video frames that depict visemes and that are usable for generating an animatable puppet. For instance, a viseme detection engine accesses a recording that includes video frames depicting a person performing various gestures, including a particular gesture for a viseme corresponding to a target sound or phoneme, and determines that audio data including the target sound or phoneme aligns with a particular video frame from the video frames that depicts the person performing the particular gesture. This alignment can be performed by comparing the audio obtained from the recording to an annotated reference audio dataset that indicates which audio blocks are the desired phonemes or sounds. In this manner, frames that depict desired visemes for an animation process can be automatically extracted from an input recording.

The following non-limiting example is provided to introduce certain embodiments. In this example, a viseme detection engine accesses video frames depicting a person performing gestures that can be used for generating a layered puppet, along with an input audio dataset that includes audio of one or more target phonemes. One or more gestures depicted in the video frames is a viseme corresponding to a target sound or phoneme. For instance, if viseme detection engine is used to capture visemes for the phonemes "Aa," "D," "Oh," and "Ee," a computing device equipped with a video camera and a microphone can prompt a user to speak the word "Adobe," and then record the user's face and voice as the users says "Adobe."

Continuing with this example, to extract the visemes from the recorded frames, the viseme detection engine accesses a reference audio dataset with an annotation identifying a reference audio portion as having the target sound or phoneme. For instance, the reference audio dataset could include several audio portions of the phonemes "Aa," "D," "Oh," and "Ee," along with respective annotations identifying the reference audio portions as including the phonemes. The viseme detection engine applies a dynamic time warping operation, or other suitable audio analysis, to the reference audio dataset and the input audio dataset. The audio analysis allows the viseme detection engine to match a particular audio data portion from the input audio dataset to a particular annotated reference audio portion. The viseme detection engine retrieves the annotation for the matched reference audio portion (e.g., the phoneme "Oh"), identifies a video frame corresponding to the matched input audio portion, and tags the identified video frame with the retrieved annotation. In this manner, the viseme detection engine obtains a video frame that depicts a user speaking the phoneme "Oh." A suitable computer graphics application can use the tagged video frame to create one or more frames of a corresponding puppet animation of the gestures. For instance, if the puppet animation involves a face speaking the "Oh" phoneme, the tagged "Oh" frame can be used as the basis for animating the face for that gesture.

As used herein, the term "frame" is used to refer to an image that is a portion of a video.

As used herein, the term "viseme" is used to refer to an image that depicts a person's face as he or she speaks a particular phoneme.

As used herein, the term "phoneme" is used to refer to a sound that is a perceptually distinct unit of one or more words in a particular language.

As described herein, certain embodiments provide improvements in computer animation. For example, these embodiments use dynamic time-warping or other audio analyses to automatically detect frames of an input video that depict a user speaking certain sounds. These embodiments allow automatically selected images from a real speaker to be used as the basis for animating a character that speaks the same sounds. Thus, embodiments described herein improve computer-implemented processes for automatically creating animations of facial expressions (e.g., visemes) that can be synchronized with appropriate sounds (e.g., phonemes).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Examples of Automatically Detecting Visemes in a Video

FIG. 1 depicts an example of a computing environment 100 in which frames depicting certain visemes are automatically detected and used for generating an animatable puppet, in accordance with one or more embodiments. The computing environment 100 includes one or more computing devices that execute a viseme detection engine 102. The viseme detection engine 102 can be included, for example, in a computer graphics application that is executed on a server system, a user device, or some combination thereof. The computing environment 100 also includes one or more data storage devices that store an input recording 104 and a reference audio dataset 118. The viseme detection engine 102 detects, extracts, and tags a set of viseme frames 124 based on an analysis of the input recording 104 with respect to the reference audio dataset 118.

For instance, the input recording 104 includes an input video 106 and an input audio dataset 110. The input video 106 can include video frames 108a-c that depict a person performing certain gestures (e.g., facial expressions) while speaking certain words or otherwise making certain sounds. The input audio dataset 110 can include portions of audio data 112a-c having audio of the words or other sounds the person spoke while performing the gestures. The input recording 104 also includes timestamps 114a-c. A timestamp 114a can identify a time period in which, during a playback operation, a frame 108a is to be displayed and audio data 112a is to be played. A timestamp 114b likewise identifies a time period for a frame 108b and audio data 112b, and a timestamp 114c likewise identifies a time period for a frame 108c and audio data 11c.

The viseme detection engine 102 can match certain audio data portions from the input audio dataset 110 to the reference audio dataset 118. For instance, in the example of FIG. 1, the input recording 104 includes three frames 108a-c. The viseme detection engine 102 analyzes the accompanying audio data 112a-c to determine which visemes are depicted in these frames 108a-c. This analysis includes comparing the input audio dataset 110 to the reference audio dataset 118 having reference audio portions 120a-c. The reference audio dataset 118 includes annotations 122a-c that respectively identity phonemes or other sounds within the reference audio portions 120a-c. For instance, in FIG. 1, the annotation 122a for the reference audio portion 120a indicates that it has the "D" sound, the annotation 122b for the reference audio portion 120b indicates that it has the "Oh" sound, and the annotation 122c for the reference audio portion 120c indicates that it has the "Ee" sound.

The viseme detection engine 102 can determine that the reference audio portions 120a-c match or are sufficiently similar to the input sets of audio data 112a-c. The viseme detection engine 102 can also determine that the input sets of audio data 112a-c respectively include the sounds "D," "Oh," and "Ee." The viseme detection engine 102 can therefore determine that the frame 108a located at the timestamp 114a corresponding to the input audio data 112a should be tagged as depicting the "D" viseme, the frame 108b located at the timestamp 114b corresponding to the input audio data 112b should be tagged as depicting the "Oh" viseme, and the frame 108c located at the timestamp 114b corresponding to the input audio data 112c should be tagged as depicting the "Ee" viseme. The viseme detection engine 102 can perform this tagging operation and thereby generate a set of viseme frames 124 that include frames 126a-c with the tags 128a-c. A tag is a keyword, phrase, or other label that is included in metadata of a frame and thereby describes the content of the frame. Details of the selection and tagging process are described herein with respect to FIG. 3.

Although FIG. 1 depicts three frames, audio blocks, and timestamps for illustrative purposes, an input recording can have any number of frames, audio blocks, and timestamps. Furthermore, a first step of timestamps associated with frames may be different from a second set of timestamps associated with audio portions. In a simplified example, timestamps for the input audio dataset 110 could have a resolution of 0.1 seconds, and timestamps for the input video 106 could have a resolution of 0.01 seconds. In this example, a timestamp 114b may indicate the start time of an audio portion, such as time 1:00:10, and thereby identify a corresponding time period in which the frame 108b is displayed, such as the time period from 1:00:10 to 1:00:20. However, the frame 108b may actually be displayed at time 1:00:15.

One or more recording devices 116 can be used to capture an input video 106 having a set of video frames 108-c of the input video 106, as well as an input audio dataset 110 corresponding to the input video 106. One or more recording devices 116 can generate the input audio dataset 110 by recording a person speaking various words, phonemes, or other sounds. The target sound or phoneme and the different sound or phoneme. One or more recording devices 116 can generate the video frames 108a-c by recording a person performing the gestures. In some embodiments, a suitable computer application can output one or more prompts via one or more presentation devices 132 (e.g., a display device, an audio output device, etc.) that instruct the person to perform the gestures, speak the sounds, or both. For instance, the computer application can output, via a presentation device 132, a prompt to speak the word "Adobe." The computer application can configure one or more recording devices 116 (e.g., a video camera, a microphone, or both) to store data captured via the recording devices 116 subsequent to the prompt. The captured data can include the input recording 104.

In some embodiments, the computing environment 100 also includes one or more computing devices that execute a puppet generation engine 130. The puppet generation engine 130 could be included in the same computer graphics application as the viseme detection engine 102, or could be included in a separate software application. The puppet generation engine 130 can generate an animatable puppet from the viseme frames 124. The animatable puppet can be displayed on one or more presentation devices 132. Examples of generating animatable puppets are described herein with respect to FIGS. 4-26.

Figure 2:
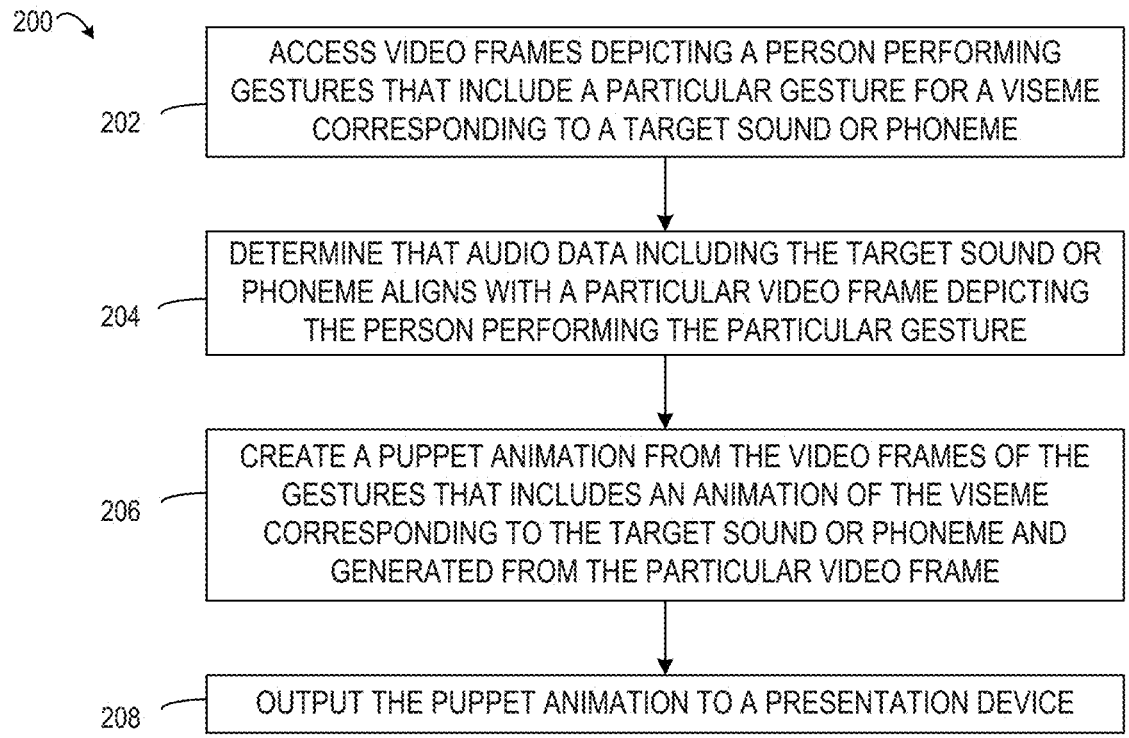
FIG. 2 depicts an example of a process for using automatically detected frames depicting certain visemes for generating an animatable puppet, in accordance with one or more embodiments.

FIG. 2 depicts an example of a process 200 for using automatically detected frames depicting certain visemes for generating an animatable puppet, in accordance with one or more embodiments. One or more computing devices included in the computing environment 100 implement operations depicted in FIG. 2 by executing suitable program code. For illustrative purposes, the process 200 is described with reference to certain examples depicted in the figures. Other implementations, however, are possible.

At block 202, the process 200 involves accessing video frames depicting a person performing gestures that include a particular gesture for a viseme corresponding to a target sound or phoneme. One or more computing devices can execute suitable program code to implement block 202. For instance, a computing device can execute a viseme detection engine 102 that receives or otherwise accesses an input recording 104 stored on a memory device. The viseme detection engine 102 can identify frames 108a-c that are included in the input recording.

At block 204, the process 200 involves determining that audio data including the target sound or phoneme aligns with a particular video frame depicting the person performing the particular gesture. One or more computing devices can execute suitable program code to implement block 204. For instance, a computing device can execute a viseme detection engine 102 that analyzes the audio data 112a-c associated with the frames 108a-c of the input recording 104. The computing device identifies gestures in the frames 108a-c by analyzing the audio data 112 and determining a sound, phoneme, phone, etc. that the character is making or saying in a particular image or frame. For instance, the computing device identifies the corresponding image or frame in which the character is making or saying the sound, phoneme, phone, etc. To do so, the viseme detection engine 102 analyzes the audio data and determines or identifies a frame of the content stream that is aligned with a phoneme or phone of the word "Hello" such as, for example, a frame aligned with the "L" sound.

At block 206, the process 200 involves creating, from at least some of the video frames, a puppet animation of the gestures that includes an animation of the viseme corresponding to the target sound or phoneme and generated from the particular video frame. One or more computing devices can execute suitable program code to implement block 206. For instance, a computing device can execute a puppet generation engine 130 of a computer graphics application. The puppet generation engine 130 can stylize the frames that have been identified as depicting visemes, use the identified frames as a basis for generating graphical content depicting facial expressions, or some combination thereof.

At block 208, the process 200 involves outputting the puppet animation to a presentation device. One or more computing devices can execute suitable program code to implement block 208. For instance, a puppet generation engine 130 or other component of a computer graphics application can instruct a presentation device 132 to render a sequence of images or graphics (e.g., the puppet animation) for display.

Figure 3:
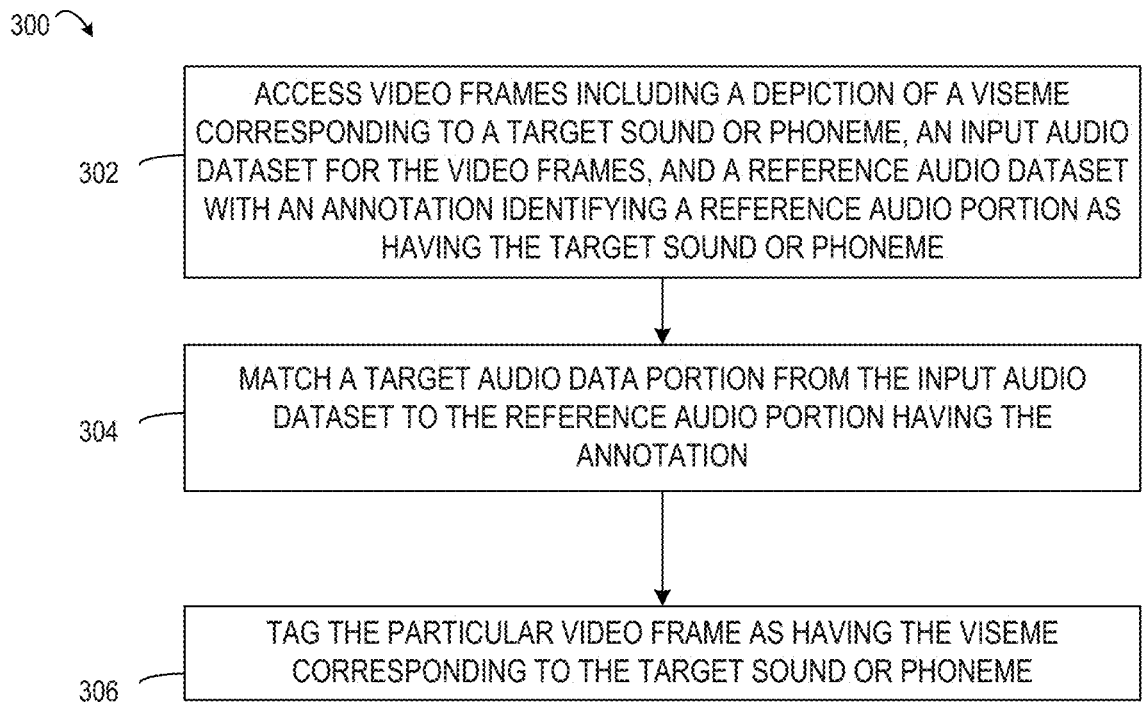
FIG. 3 depicts an example of a process for using automatically detected frames depicting certain visemes for generating an animatable puppet, in accordance with one or more embodiments.

FIG. 3 depicts an example of a process 300 for using automatically detected frames depicting certain visemes for generating an animatable puppet, in accordance with one or more embodiments. One or more computing devices included in the computing environment 100 implement operations depicted in FIG. 3 by executing suitable program code. For illustrative purposes, the process 300 is described with reference to certain examples depicted in the figures. Other implementations, however, are possible.

At block 302, the process 300 involves accessing video frames including a depiction of a viseme corresponding to a target sound or phoneme, an input audio dataset for the video frames, and a reference audio dataset with an annotation identifying a reference audio portion as having the target sound or phoneme. One or more computing devices can execute suitable program code to implement block 302. For instance, as described above with respect to FIG. 1, one or more recording devices 116 that are communicatively coupled to a computing device can be used to generate an input recording 104. The input recording 104 can include video frames captured with a video recording device and audio data captured with an audio recording device. The computing device can store the input recording in a suitable memory device. At block 302, a computing device that executes a viseme detection engine 102, which can be the same device that generated the input recording 104 or a different device, retrieves the input recording 104 from the memory device. The viseme detection engine 102 also retrieves, from a memory device, a reference audio dataset 118 that has annotations of particular phonemes or other sounds.

At block 304, the process 300 involves matching a target audio data portion from the input audio dataset to the reference audio portion having the annotation. One or more computing devices can execute suitable program code to implement block 304. For instance, the viseme detection engine 102 can execute one or more audio analysis algorithms that compare sets of input audio 112a-c to reference audio portions 120a-c. The viseme detection engine 102 can determine whether the signal in a certain block of the input audio dataset 110 matches or is sufficiently similar to a corresponding block of the reference audio dataset 118.

In some embodiments, matching target audio data to the reference audio portion can involve applying a dynamic time warping operation to the audio data and the reference audio portion. In one example, the viseme detection engine 102 can access target audio data (e.g., an audio sample of a speaker saying "Lightroom") and apply a dynamic time warping operation that aligns the target audio data to a reference audio dataset (e.g. an annotated audio sample of a speaker saying the same word or phrase). The output of the dynamic time warping operation can be a set of squash/stretch values for various blocks of input audio samples. The set of squash/stretch values indicates how each block of a target audio dataset must be modified to make the target audio block identical to a corresponding block of a reference audio dataset (or vice versa). The viseme detection engine 102 can compute offsets to be applied to blocks of the target audio data that align the target blocks with corresponding audio blocks from the reference audio portion. The viseme detection engine 102 aligns the target audio data and the reference audio portion by creating or updating a mapping data structure in which various audio blocks from the target audio data are identified as being matched, respectively, to various audio blocks from the reference audio dataset.

As an example of a baseline case, a dynamic time warping operation could compare six audio blocks of an input audio dataset to six audio blocks of an identical reference audio dataset (e.g., the same speaker saying the same word). In this example, the dynamic time warping operation would be expected to output a perfect 1:1 match, e.g., an array of six squash/stretch values of [1, 1, 1, 1, 1, 1]. If the input audio dataset was compared to a reference audio dataset that was offset in time, but otherwise a good match, the dynamic time warping operation would be expected to output a set of values such as [0.5, 0.5, 1, 1, 1, 1], which indicates that the first two blocks of input audio samples should be compressed and the remaining samples are a good match. Likewise, if the reference audio dataset was offset in time in the other direction, the dynamic time warping operation would be expected to output a set of values such as [2, 2, 1, 1, 1, 1], indicating that the first two blocks of input audio samples should be stretched and the remaining samples are a good match.

The viseme detection engine 102 determines, based on aligning the target and reference blocks via dynamic time warping, which target audio blocks include a particular viseme. For instance, in the example depicted in FIG. 1, a dynamic time warping operation can align the audio data 112b with the reference audio portion 120b. The viseme detection engine 102 can determine that an annotation 122b is applied to the reference audio portion 120b. The viseme detection engine 102 can determine that one or more frames 108b are associated with the same timestamp 114b as the audio data 112b that has been aligned with the annotated reference audio portion 120b. The viseme detection engine 102 can therefore select one or more frames 108b to be tagged as depicting the viseme corresponding to the phoneme or sound from the annotation 122b.

In some embodiments, the viseme detection engine 102 or other suitable engine can pre-process the input audio dataset 110 before comparing the input audio data to the reference audio dataset. For instance, the pre-processing can involve modifying amplitude levels of one or more portions of the input audio dataset 110 such that the range of levels in the input audio dataset 110 matches or approaches the range of levels in a reference audio dataset 118. In some cases, to avoid amplifying noise captured by the recording device 116 in the generation of the input audio dataset 110, the pre-processing can involve a non-linear amplification of the input audio dataset 110.

At block 306, the process 300 involves tagging the particular video frame as having the viseme corresponding to the target sound or phoneme. One or more computing devices can execute suitable program code to implement block 306. For instance, the viseme detection engine 102 can retrieve data from one or more of the annotations 122a-c for tagging one or more of the frames 108a-c and thereby generate frames 126a-c having tags 128a-c of the viseme frames 124. For instance, the viseme detection engine 102 can access or generate, for a given frame, a metadata field indicating a viseme depicted (at least in part) in the frame. The viseme detection engine 102 can update the field to include a value indicating the viseme. For instance, the viseme detection engine 102 can update the metadata of a frame 126a to indicate that the frame 126a depicts a viseme for the phoneme "D," can update the metadata of a frame 126b to indicate that the frame 126b depicts a viseme for the phoneme "Oh," and can update the metadata of a frame 126c to indicate that the frame 126c depicts a viseme for the phoneme "Ee."

In some embodiments, the viseme detection engine 102 implements one or more of blocks 302 and 304 by performing a suitability scoring operation to select a particular reference audio dataset from multiple reference audio datasets. The selected reference audio dataset is used in the matching operation described above with respect to block 304. The suitability scoring operation can generate suitability scores for the various reference audio datasets, respectively. For instance, a first suitability score for a first reference audio dataset can indicate that the first reference audio dataset is a close match to one or more attributes of the audio data. A second suitability score for a second reference audio dataset can indicate that the second reference audio dataset is a not a close match to one or more attributes of the audio data. The viseme detection engine 102 can select the first reference audio dataset, rather than the second reference audio dataset, based on a comparison of the first suitability score to the second suitability score, where the comparison indicates that the reference audio dataset matches one or more attributes of the audio data more closely than the additional reference audio dataset.

In an example of the suitability scoring operation, the viseme detection engine 102 performs a quality assessment of the squash-stretch values generated by a dynamic time warping operation. The outputted dynamic time warping operation outputs a squash/stretch value $S_i$ for each sample block i of the reference audio dataset and each sample block i of the target audio dataset. The suitability scoring operation computes a score for a particular reference audio dataset that indicates how far the squash/stretch values $S_i$ computed for the particular reference audio dataset and the target audio dataset deviate from the baseline squash/stretch values. In one example, for each sample block, an baseline squash/stretch value is "1" (i.e., no compression or stretching required).

Continuing with this example of the suitability scoring operation, the viseme detection engine 102 computes, for each viseme location i in a reference audio dataset, a respective window $w_i$. The viseme detection engine 102 also computes a location of a corresponding window of $w_i'$ in the target audio data. In some embodiments, the location of the corresponding window can be computed via linear interpolation, which can account for speed differences between the reference audio dataset and the target audio data (e.g., the same word or phrase being spoken over a time period of two seconds in the reference audio dataset and time period of four seconds in the target audio dataset). The viseme detection engine 102 extracts, from the target audio data, an audio subset $R_i$ for each window $w_i$ of the reference audio dataset and a corresponding audio subset $T_i$ for a corresponding window of $w_i'$ in the target audio data. Each subset of audio data within a respective window $w_i$ or $w_i'$ is used as an input audio block to the dynamic time warping operation. The viseme detection engine 102 applies a dynamic time warping operation to the input audio blocks from the reference audio dataset and the audio dataset (i.e., the audio subsets $R_i$ and $T_i$).

In this example, the viseme detection engine 102 computes a suitability score from a quality assessment of the dynamic time warping operation's output. For instance, the viseme detection engine 102 can compute a Root Mean Squared Error ("RMSE") value for a given stretch/squash array $[S_1, S_2, \ldots S_i \ldots S_N]$ outputted by the dynamic time warping operation. In the example involving a baseline squash/stretch value of 1, the RMSE value is computed based on the distance of each sample block from the baseline value of 1. The viseme detection engine 102 converts each squash/stretch value $S_i$ into a distance $D_i$ for use in an RMSE computation. In one example a formula for computing $D_i$ is:

$$D_i = S_i \text{ if } S_i \geq 1, \text{ else } D_i = 1/S_i.$$

In this example, the viseme detection engine can replace certain values of $S_i$ (e.g., the squash values) in an array of squash/stretch values with their multiplicative inverse of $1/S_i$. This formula can provide equal weight to both a squash (compression) and stretch operation used in an error computation. The RSME value can be computed with the following formula.

$$RMSE = \sqrt{\frac{\sum_{L=0}^{N} (1 - D_i)^2}{N}}.$$

A score for a particular reference audio dataset can be the RMSE (or other error value) or a score value that is derived from the RMSE or other error value (e.g., 1/RMSE).

In some embodiments, the viseme detection engine 102 uses an image analysis to select, for tagging, a particular video frame from a set of candidate video frames identified using the input audio dataset 110. For instance, the simplified example depicted in FIG. 1 identifies a one-to-one correspondence between audio blocks and video frames. But using the input audio dataset alone may only allow the viseme detection engine 102 to identify a set of candidate frames that includes both a video frame that depicts a viseme (e.g., frames in which a person's mouth was moving while speaking a word) and frames that do not depict the viseme (e.g., frames in which a person's mouth was not moving due to slurring or under-enunciation while speaking a word).

In these cases, the viseme detection engine 102 can extract a particular frame of interest from this set of candidate frames by applying an image analysis to the set of candidate frames. The image analysis could be, for example, a machine-learning model that has been trained to associate certain image features with certain visemes. Applying the machine-learning model to the set of candidate frames can output, for each candidate frame, a respective probability that the frame depicts a certain viseme. For instance, the viseme detection engine 102 could determine that a first candidate video frame has a first probability of depicting the person speaking the target sound or phoneme and that a second candidate video frame has a second probability of depicting the person speaking the target sound or phoneme. The viseme detection engine 102 selects the first candidate video frame as the particular video frame for tagging based on the first probability being greater than the second probability. The viseme detection engine 102 tags, at block 306, the particular video frame that has been selected from the set of candidate video frames. In this manner, the viseme detection engine 102 can use the input audio dataset 110 to determine a smaller subset of candidate video frames (rather than the entire input video 106) to which the image analysis should be applied, and then use the image analysis to extract particular candidate video frames for tagging.

In additional or alternative embodiments, the viseme detection engine 102 uses an image analysis in combination with the matching operation of block 304 to identify certain video frames that depict a certain viseme. For example, the viseme detection engine 102 can identify, from a comparison of the input audio dataset 110 with the reference audio dataset 118, a first set of timestamps at which the target sound or phoneme is present in the input audio dataset. This comparison can include, for example, the dynamic time warping operation described above with respect to block 304. The viseme detection engine 102 can identify, from an image analysis of the video frames, a second set of timestamps at which the target sound or phoneme is present in the input audio dataset. The image analysis can be performed in parallel with or separately from the audio comparison. An example of the image analysis is a machine-learning model that outputs a probability of a given frame depicting a viseme. If a given frame's probability exceeds a threshold, the viseme detection engine 102 can include the frame's time stamp in the set of time stamps. If a given frame's probability does not exceed the threshold, the viseme detection engine 102 can exclude the frame's time stamp from the set of time stamps.

The first and second sets of timestamps can include non-overlapping values. For instance, the second set of timestamps could include one or more timestamps that are absent from the first set of timestamps, and vice versa. The viseme detection engine 102 can select a particular video frame for tagging based on a timestamp of the particular video frame being in the first set of timestamps and the second set of timestamps. In this manner, the viseme detection engine 102 can pinpoint a particular video frame for a particular viseme based on a combination of an image analysis and an audio analysis. For instance, non-overlapping time stamps can correspond to false negatives in the image analysis, such as a timestamp for an image of a facial expression that resembles (but is not) a depiction of a viseme, and/or false negatives from the audio comparison, such as a timestamp corresponding to a frame where the speaker under-enunciated while speaking a particular phoneme or other sound.

Examples of Generating an Animatable Puppet

In some embodiments, an animatable puppet is generated using a content stream (e.g., a video stream). For example, a computer graphics device captures a video stream of a person performing various gestures and identifies the person's face or features of the person's face. The computer graphics device identifies the gestures in the video stream and the corresponding frames in the video stream in which the person is performing the gestures and separates the frames into individual layers or frames. The computer graphics device can augment each individual frame or layer by applying a particular artistic style to the frame, simulating various poses, views, or angles of the person's face in the frame, or caricaturizing the person's face in the frame. The computer graphics device can automatically generate a layered animatable puppet using the various individual frames or augmented frames by combining the individual frames in which the person is performing the various gestures to create a layered puppet. The computer graphics device can animate and output the layered puppet such that the layered augmented puppet makes or performs gestures that resemble the gestures made by the person in the video stream.

For instance, the computer graphics device receives a video stream from another device (e.g., a camera) and the video stream includes a person. The computer graphics device identifies or extracts the person's face by identifying various features of the person's face. In this example, the video stream includes one or more images or frames of the person performing various gestures that can be used to generate an animatable puppet. As an example, in a frame of the video stream, the person is smiling and in another frame the person is frowning. The computer graphics device can identify various gestures in the video stream and the corresponding image or frame in which the character is performing the gestures. (As used herein, the term "character" is used to refer to any person or creature.) As another example, the computer graphics device identifies various gestures and the corresponding image or frame by analyzing audio associated with the video stream. In this example, the computer graphics device analyzes the audio and determines or identifies a frame or image that is aligned with a sound, phoneme, or phone that the character is making. For example, the image or frame could depict the character making a gesture resembling a viseme that corresponds to a particular phoneme or phone. In some examples, the computer graphics device separates each identified frame or image into an individual layer. (As used herein, the term "layer" is used to refer to any identified individual frame or image of a video that is separated from other images or frames of the video.)

In some examples, the computer graphics device can perform one or more augmentation operations on each individual layer to generate an augmented layer. As an example, the computer graphics device applies a style or texture to each layer to create various stylized layers. Continuing with this example, the computer graphics device can automatically generate a layered animatable puppet using the various individual layers or using the augmented layers. For example, the computer graphics device combines the identified layers in which the character is performing the identified gestures to create a layered puppet. The computer graphics device can combine the various layers or augmented layers to generate a layered puppet and the generated layered puppet can be animated to perform gestures that resemble the various gestures performed by the person in the video stream. As an example, the computer graphics device generates a layered puppet and outputs the layered puppet such that the layered puppet makes or performs the smiling gesture or the frowning gesture similar to the smiling or frowning gestures performed by the person in the video stream.

Figure 4:
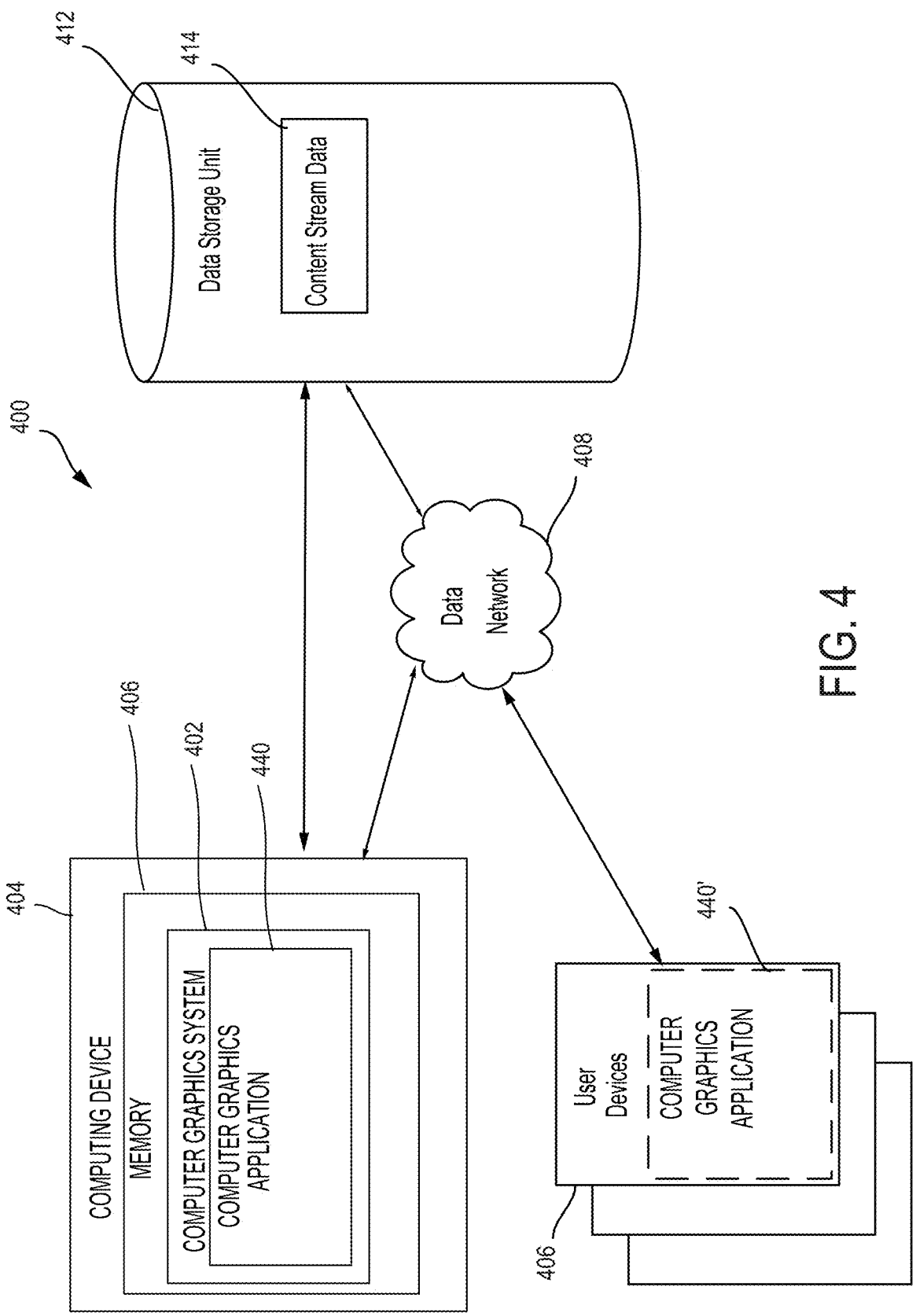
FIG. 4 depicts an example of a computing environment in which a computer graphics system generates an animatable puppet using a content stream, in accordance with one or more embodiments.

FIG. 4 depicts an example of a computing environment 400 in which a computer graphics system 402 generates a layered animatable puppet using a content stream, in accordance with one or more embodiments. The computing environment 400 includes the computer graphics system 402, one or more computing devices 404, and one or more data storage units 412. The computer graphics system 402, the computing devices 404, and the data storage unit 412 are communicatively coupled via one or more data networks 408 (e.g., the Internet, one or more local area networks ("LAN"), one or more wired area networks, or some combination thereof). In some embodiments, one or more elements of the computing environment 400 can be combined with one or more elements of the computing environment 100.

In some embodiments, a user of the computing device 404 visits a webpage or an application store to explore applications supported by the computer graphics system 402. The computer graphics system 402 provides the applications as a software as a service ("SaaS"), or as a standalone application that may be installed on the computing device 404, or as a combination.

In some embodiments, the computing device 404 represents various types of client devices. For example, the computing device 404 is a mobile device (e.g., a mobile telephone, a smartphone, a PDA, a tablet, a laptop, a camera, a tracker, a watch, a wearable device, etc.). The computing device 404, however, in some embodiments, is a non-mobile device (e.g., a desktop computer or another type of client device). In this example, the computer graphics system 402 is implemented on, executed by, or stored on one or more computing devices 404. For example, the computer graphics system 402 is stored on a memory device 406 of the computing device 404. In some embodiments, the computer graphics system 402 is executed on the one or more computing devices 404 via a computer graphics application 440.

In some embodiments, the user devices 410 can be any type of client device and may include a computer graphics application 440. In this example, one or more components of the computer graphics system 402 may be stored on, implemented on, or executed by the user devices 410.

The data storage unit 412 stores content stream data 414 that includes one or more content streams. A content stream can be any sequence or stream of images or frames such as, for example, a video stream. In some examples, the content stream data 414 includes audio data associated with the content stream. The audio data or file can indicate one or more sounds or phones in each of the various images or frames of the content stream. The content stream data 414 can be obtained from the computing device 404, the user device 410, or any other source. As an example, the computing device 404 or the user device 410 may include a camera or other device configured to capture one or more images of a user of the computing device 404 or the user device 410. In some embodiments, the computing device 404 or the user device 410 can be communicatively coupled to the data storage unit 412 via one or more data networks 408 and the data storage unit 412 receives or obtains a content stream, an image, or one or more frames from the user device 410 or the computing device 404. In some embodiments, the computing device 404 is communicatively coupled to the data storage unit 412 and the computing device 404 receives or obtains content stream data 414 from the data storage unit 412 via the data network 408 or a direct connection. In another embodiment, the computing device 404 includes the data storage unit 412 and can access the content stream data 414. In still another embodiment, the computing device 404 is communicatively coupled to the user device 410 and receives or obtains content stream data 414 from the user device 410.

In some embodiments, the computer graphics system 402 includes the computer graphics application 440, which can include one or more instructions stored on a computer-readable storage medium and executable by one or more processors of one or more computing devices (e.g., a processor of the computer graphics system 402, the user device 410, or any other device). When executed by the one or more processors, the computer-executable instructions of the computer graphics application 440 cause the computer graphics system 402 to generate a layered animatable puppet using a content stream. In some embodiments, the computer graphics application 440 includes one or more of the viseme detection engine 102 and the puppet generation engine 130 described above with respect to FIGS. 1-3.

For example, the computer graphics application 440 causes the computer graphics system 402 to obtain or receive content stream data 414 from the data storage unit 412, the user device 410, or any other source. The content stream data 414 includes data indicating a content stream such as, for example, a video stream. In some examples, one or more images or frames of the content stream include a character such as, for example, a user of the computing device 404 or the user device 410. In some embodiments, the computer graphics application 440 causes the computer graphics system 402 to obtain or receive audio data associated with the content stream from the data storage unit 412, the user device 410, or any other source. The audio data or file can indicate one or more sounds or phones in each of the various images or frames of the content stream such as, for example, a sound made by the character in the frame or image.

In some embodiments, the computer graphics application 440 causes the computer graphics system 402 to identify or extract a face of the character in the video stream. For example, the computer graphics application 440 causes the computer graphics system 402 to identify or extract the character's face by identifying various regions or features of the character's face. In some embodiments, the content stream obtained or received by the computer graphics system 402 includes one or more frames in which the character is performing various gestures that can be used to generate an animatable puppet. As an example, in a frame, the character is making a gesture with the character's mouth that resembles a viseme for a sound, phoneme, phone, etc. For instance, in a frame of the content stream, the character is making a gesture that resembles the character saying the "H" sound (e.g., a frame from a set of the frames that, as a group, depict a character saying the word "Hello"). As another example, in a frame of the video stream, the character is making a smiling or frowning gesture.

The computer graphics application 440 can cause the computer graphics system 402 to identify the various gestures in the content stream and the corresponding frames in which the character is performing the gestures. In some examples, the computer graphics application 440 causes the computer graphics system 402 to automatically identify a gesture and the corresponding image or frame. For example, the computer graphics system 402 analyzes the face or feature of the character in a frame of the content stream and determines, identifies, or detects a gesture performed by the character in the frame based on the character's face or feature. In this example, the computer graphics system 402 identifies the corresponding frame or image in which the character is performing the gesture. As another example, the computer graphics system 402 identifies gestures in the content stream and the corresponding frame by analyzing audio data associated with the content stream and determining a sound, phoneme, phone, etc. that the character is making or saying in a particular image or frame. In this example, the computer graphics system 402 identifies the corresponding image or frame in which the character is making or saying the sound, phoneme, phone, etc. As an example, the computer graphics system 402 analyzes the audio data and determines or identifies a frame of the content stream that is aligned with a phoneme or phone of the word "Hello" such as, for example, a frame aligned with the "L" sound. As still another example, the computer graphics system 402 receives or obtains the content stream from a camera of the computing device 404 or the user device 410 (e.g., in real-time) and the computer graphics application 440 causes the computer graphics system 402 to output a request to a user of the computing device 404 or the user device 410 to perform a particular gesture. In this example, the computer graphics system 402 analyzes the content stream and compares one or more gestures performed by the user to the particular gesture to determine whether a gesture performed by the user corresponds to the particular gesture. In this example, in response to determining that a gesture performed by the user corresponds to the particular gesture, the computer graphics system 402 identifies a frame of the content stream in which the user performs the gesture. In still another example, the computer graphics system 402 receives or obtains the video stream from the camera of the computing device 404 or the user device 410 (e.g., in real-time) and user input indicating a frame in which the user of the computing device 404 or the user device 410 is performing a particular gesture. For instance, the computer graphics system 402 receives a video stream from the camera and the user is performing a gesture that resembles the user saying a sound for the letter "C." The computer graphics system 402 also receives user input indicating the frame in which the user is performing the gesture (e.g., by user input to capture the particular frame).

In some embodiments, the computer graphics application 440 causes the computer graphics system 402 to separate each identified frame in which the character is performing a gesture into an individual layer. For example, the computer graphics application 440 causes the computer graphics system 402 to identify each frame in which the character is performing one or more gestures that resemble the character saying the sounds of the letters "H," "E," "L," "L," and "O." The computer graphics application 440 separates each frame into an individual layer.

The computer graphics application 440 can cause the computer graphics system 402 to perform one or more augmentation operations on each individual layer to generate an augmented layer. For example, the computer graphics system 402 receives user input indicating a particular artistic style or texture to be applied to one or more layers. The computer graphics application 440 causes the computer graphics system 402 to apply the style or texture to the layer to create a stylized layer. As another example, the computer graphics system 402 receives user input indicating a command to simulate or synthesize a three-dimensional model of an individual layer. The computer graphics application 440 causes the computer graphics system 402 to generate one or more augmented layers by simulating or synthesizing various poses, views, or angles of the character in the individual layer. As still another example, the computer graphics system 402 receives user input to caricaturize one or more of the layers. The computer graphics application 440 causes the computer graphics system to generate one or more augmented layers by warping, distorting, or otherwise modifying the one or more layers. In some examples, the computer graphics system 402 can perform one or more augmentation operations in combination or individually on each individual layer to generate an augmented layer.

In some embodiments, the computer graphics application 440 causes the computer graphics system 402 to automatically generate a layered puppet using one or more layers. For example, the computer graphics application 440 causes the computer graphics system 402 to combine the layers in which the character is performing one or more identified gestures to generate a layered puppet (e.g., combine the layers in which the character is performing one or more gestures that resembles the character saying the sounds of the letters "H," "E," "L," "L," and "O"). In another embodiment, the computer graphics application 440 causes the computer graphics system 402 to automatically generate a layered puppet using one or more of the augmented layers. For example, the computer graphics application 140 causes the computer graphics system 402 to augment the layers in which the character is performing one or more identified gestures and combine the augmented layers to generate a layered augmented puppet.

In this example, the computer graphics application 440 causes the computer graphics system 402 to combine the various layers or the augmented layers to automatically generate a layered puppet that can be animated to perform gestures that resemble the various gestures performed by the character in the content stream. As an example, the computer graphics system 402 identifies a frame in the content stream in which the character is performing a gesture that resembles the character saying the sound of a letter from the word "Hello" (i.e., the "H" sound, the "L" sound, etc.). The computer graphics system 402 separates each frame into an individual layer. The computer graphics system 402 can augment (e.g., stylize) each identified layer to generate one or more augmented layers and combine the augmented layers together to generate a layered augmented puppet. The computer graphics system 402 can animate the layered augmented puppet and output the layered augmented puppet via a user interface such that the layered augmented puppet makes or performs one or more gestures that can be perceived as the animated puppet saying the sounds from the individual letters "H," "E," "L," "L," and "O" of the word "Hello." Thus, in this manner, the computer graphics system 402 can automatically generate a layered animated puppet using a content stream.

While, in some examples, the computer graphics system 402 is described as performing one or more augmentation operations on a layer to generate an augmented layer, the present disclosure is not limited to such configurations. Rather, in some embodiments, the computer graphics system 402 may not perform an augmentation operation on a layer.

Although the computing environment 400 of FIG. 1 is depicted as having a certain number of components, in other embodiments, the computing environment 400 has any number of additional or alternative components. Further, while FIG. 4 illustrates a particular arrangement of the computer graphics system 402, user devices 410, and the data storage unit 412, various additional arrangements are possible. As an example, while FIG. 4 illustrates data storage unit 412 and the computer graphics system 402 as part of separate systems, in some embodiments, the data storage unit 412 and the computer graphics system 402 are part of a single system.

In some embodiments, a computer graphics system 402 is implemented on, executed by, or stored on one or more computing devices 404. In some embodiments, the computing device 404 is communicatively or electronically coupled to a data storage unit 412 that stores the content stream as content stream data 414. The content stream data 414 includes data indicating the content stream such as, for example, a video stream. In some examples, the content stream includes one or more frames that include a character such as, for example, a user of the computing device 404 or the user device 410. In some embodiments, the content stream data 414 includes audio data that indicates one or more sounds or phones associated with each of the various frames (e.g., a sound made by the character in the frame).

In some embodiments, the computer graphics system 402 includes a computer graphics application 440, which can include one or more instructions stored on a computer-readable storage medium and executable by one or more processors of one or more computing devices (e.g., a processor of the computer graphics system 402, the user device 410, or any other device). When executed by the one or more processors, the computer-executable instructions of the computer graphics application 440 can cause the computer graphics system 402 to receive or obtain the content stream data 414 from the data storage unit 412 via a data network 408. In another embodiment, the computing device 404 includes the data storage unit 412 and the computer graphics system 402 can access the content stream data 414. In another embodiment, the computer-executable instructions of the computer graphics application 440 can cause the computer graphics system 402 to receive or obtain the data indicating a content stream from the computing device 404, the user device 410, or any other source. As an example, the computing device 404 or the user device 410 may include a camera or other device configured to capture one or more content streams such as, for example, images or frames that include the user of the computing device 404 or the user device 410. In some embodiments, the computing device 404 or the user device 410 can be communicatively coupled to the data storage unit 412 via one or more data networks 408 and the data storage unit 412 receives or obtains a content stream, image, or frame of the user device 410 or the computing device 404. In some embodiments, the computing device 404 is communicatively coupled to the data storage unit 412 and the computing device 404 receives or obtains content stream data 414 from the data storage unit 412 via the data network 408 or a direct connection. In some embodiments, the computing device 404 is communicatively coupled to the user device 410 and the computing device 404 receives or obtains data indicating the content stream from the user device 410 via the data network 408 or a direct connection.

Figure 5:
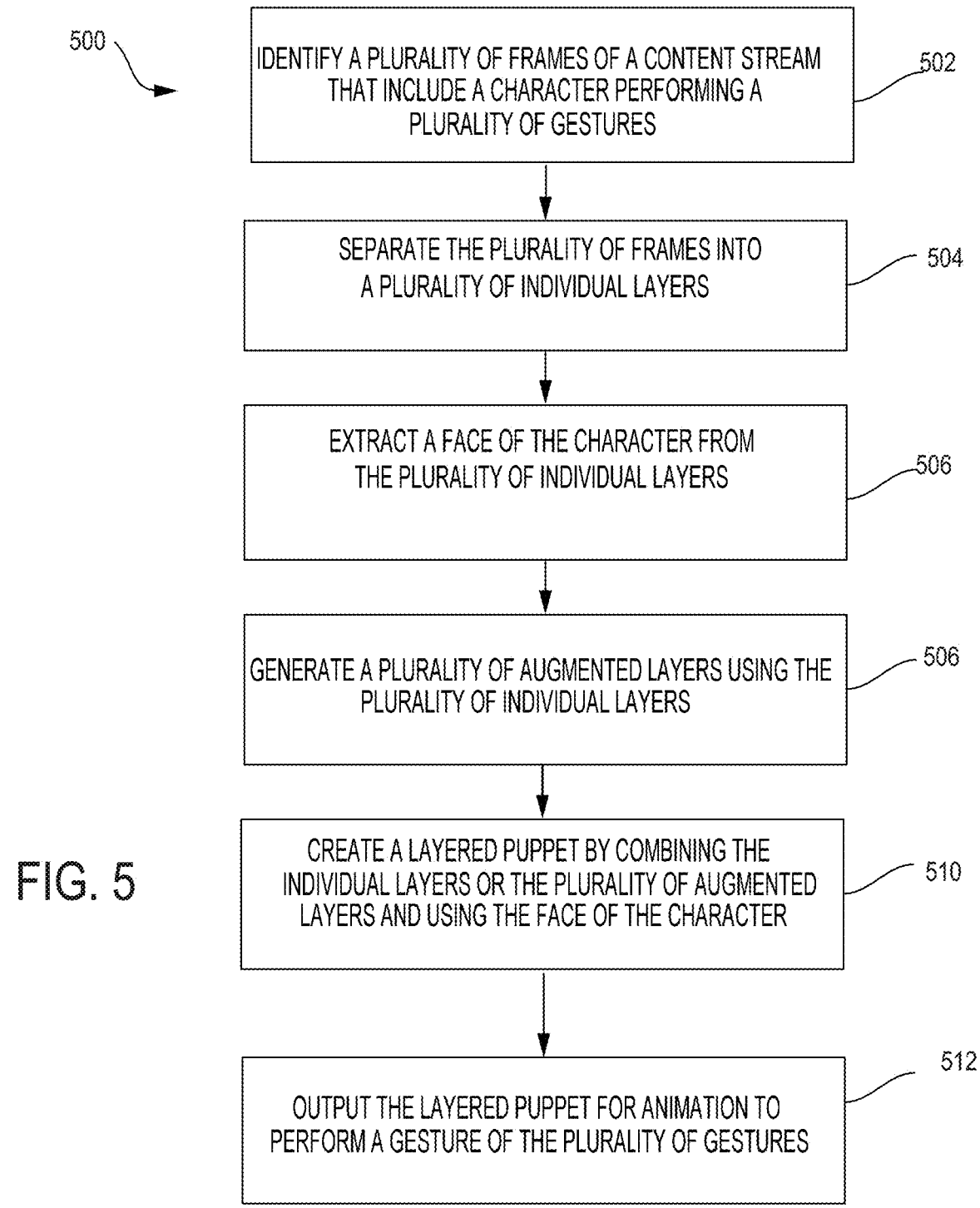
FIG. 5 is depicts an example of a process for generating a layered animatable puppet using a content stream, in accordance with one or more embodiments.

FIG. 5 depicts an example of a process 500 for generating a layered animatable puppet using a content stream, in accordance with one or more embodiments. In some embodiments, one or more processing devices such as, for example, the computing system described herein with respect to FIG. 6, implement operations depicted in FIG. 5 by executing suitable program code (e.g., the computer graphics system 402 of FIG. 4) that implements one or more algorithms encompassed by the process 500. For illustrative purposes, the process 500 is described with reference to the examples depicted in FIG. 4, but other implementations are possible.

Figure 6:
FIG. 6 depicts an example of a frame of a content stream in which a character performs a gesture that can be used to generate a layered animatable puppet, in accordance with one or more embodiments.

In block 502, various frames of a content stream that include a character performing various gestures are identified. For instance, the content stream obtained or received by the computer graphics system 402 can include one or more frames in which the character is performing various gestures that can be used to generate an animatable puppet. As an example, in a frame of the content stream, the character is making a smiling or frowning gesture. As another example, in a frame of the content stream, the character is making a gesture that resembles the character making a sound (e.g., a phoneme or phone of a word). For example, FIG. 6 depicts an example of a frame of a content stream in which a character is performing a gesture that can be used to generate an animatable puppet. In the example depicted in FIG. 6, the character is performing a neutral expression gesture that can be used to generate an animated puppet that can make a corresponding neutral expression gesture.

Figure 7:
FIG. 7 depicts another example of a frame of a content stream in which a character performs a gesture that can be used to generate a layered animatable puppet, in accordance with one or more embodiments.
Figure 8:
FIG. 8 depicts another example of a frame of a content stream in which a character performs a gesture that can be used to generate a layered animatable puppet, in accordance with one or more embodiments.
Figure 9:
FIG. 9 depicts another example of a frame of a content stream in which a character performs a gesture that can be used to generate a layered animatable puppet, in accordance with one or more embodiments.
Figure 10:
FIG. 10 depicts another example of a frame of a content stream in which a character performs a gesture that can be used to generate a layered animatable puppet, in accordance with one or more embodiments.

FIG. 7 depicts another example of a frame of a content stream in which a character is performing a gesture that can be used to generate a layered animatable puppet. In the example depicted in FIG. 7, the character is performing a closed eyes gesture that can be used to generate an animated puppet that can make a corresponding closed eyes gesture. FIG. 8 depicts another example of a frame of a content stream in which a character is performing a gesture that can be used to generate a layered animatable puppet. In the example depicted in FIG. 8, the character is performing a smiling gesture that can be used to generate an animated puppet that can make a corresponding smiling gesture. FIG. 9 depicts another example of a frame of a content stream in which a character is performing a gesture that can be used to generate a layered animatable puppet. In the example depicted in FIG. 9, the character is performing a surprised expression gesture that can be used to generate an animated puppet that can make a corresponding surprised expression gesture. FIG. 10 depicts another example of a frame of a content stream in which a character is performing a gesture that can be used to generate a layered animatable puppet. In the example depicted in FIG. 10, the character is performing a gesture that resembles the character saying the sound of the letter "A" in the word "Cat." The gesture is used to generate an animated puppet that can make a corresponding gesture.

Figure 11:
FIG. 11 depicts another example of a frame of a content stream in which a character performs a gesture that can be used to generate a layered animatable puppet, in accordance with one or more embodiments.
Figure 12:
FIG. 12 depicts another example of a frame of a content stream in which a character performs a gesture that can be used to generate a layered animatable puppet, in accordance with one or more embodiments.
Figure 13:
FIG. 13 depicts another example of a frame of a content stream in which a character performs a gesture that can be used to generate a layered animatable puppet, in accordance with one or more embodiments.
Figure 14:
FIG. 14 depicts another example of a frame of a content stream in which a character performs a gesture that can be used to generate a layered animatable puppet, in accordance with one or more embodiments.
Figure 15:
FIG. 15 depicts another example of a frame of a content stream in which a character performs a gesture that can be used to generate a layered animatable puppet, in accordance with one or more embodiments.
Figure 16:
FIG. 16 depicts another example of a frame of a content stream in which a character performs a gesture that can be used to generate a layered animatable puppet, in accordance with one or more embodiments.
Figure 17:
FIG. 17 depicts another example of a frame of a content stream in which a character performs a gesture that can be used to generate a layered animatable puppet, in accordance with one or more embodiments.
Figure 18:
FIG. 18 depicts another example of a frame of a content stream in which a character performs a gesture that can be used to generate a layered animatable puppet, in accordance with one or more embodiments.
Figure 19:
FIG. 19 depicts another example of a character performing a gesture that can be used to generate a layered animatable puppet, in accordance with one or more embodiments.
Figure 20:
FIG. 20 depicts another example of a frame of a content stream in which a character performing a gesture that can be used to generate a layered animatable puppet, in accordance with one or more embodiments.

FIGS. 11-20 are images depicting examples of frames from a content stream in which a character is performing a gesture that can be used to generate a layered animatable puppet. FIG. 11 depicts an example of a frame of a content stream in which a character performs a gesture for speaking the word "Dog" or another word with the "D" phoneme. FIG. 12 depicts an example of a frame of a content stream in which a character performs a gesture for speaking the word "Eel" or another word with the "Ee" phoneme. FIG. 13 depicts an example of a frame of a content stream in which a character performs a gesture for speaking the word "Frog" or another word with the "F" phoneme. FIG. 14 depicts an example of a frame of a content stream in which a character performs a gesture for speaking the word "Louse" or another word with the "L" phoneme. FIG. 15 depicts an example of a frame of a content stream in which a character performs a gesture for speaking the word "Mink" or another word with the "M" phoneme. FIG. 16 depicts an example of a frame of a content stream in which a character performs a gesture for speaking a word with the "Oh" phoneme, such as "toad." FIG. 17 depicts an example of a frame of a content stream in which a character performs a gesture for speaking a word with the "R" phoneme, such as "rabbit." FIG. 18 depicts an example of a frame of a content stream in which a character performs a gesture for speaking a word with the "S" phoneme, such as "snake." FIG. 19 depicts an example of a character performs a gesture for speaking a word with the "Uh" phoneme, such as "guppy." FIG. 20 depicts an example of a character performs a gesture for speaking a word with the "Oo" phoneme, such as "loon.

Returning to FIG. 5, in block 502, the computer graphics application 440 can cause the computer graphics system 402 to identify the various gestures in the content stream and the corresponding image in which the character is performing the identified gestures (e.g., identify the various gestures in FIGS. 6-20 and the corresponding frames).

In some examples, the computer graphics application 440 causes the computer graphics system 402 to automatically identify or detect the gestures and the corresponding image or frame. For example, the computer graphics system 402 analyzes a feature of the character (e.g., the face or other feature of the character) in each frame of the content stream and determines, identifies, or detects a gesture performed by the character in each frame based on the feature of the character. For instance, the computer graphics system 402 analyzes the character's mouth in a frame, determines that the character is performing a smiling gesture based on the character's mouth, and identifies the frame in which the character is performing the smiling gesture. In another example, the computer graphics system 402 receives or obtains the content stream from a camera of the computing device 404 or the user device 410 (e.g., in real-time) and the computer graphics application 440 causes the computer graphics system 402 to output a request to a user of the computing device 404 or the user device 410 to perform a particular gesture. In this example, the computer graphics system 402 analyzes the content stream and compares a gesture performed by the character in one or more frames to the particular gesture to determine if it corresponds to the particular gesture. The computer graphics system 402 identifies a frame of the video stream in which the user performs the particular gesture in response to determining that a gesture performed by the user corresponds to the particular gesture. As an example, the computer graphics system 402 outputs data to the user to perform a smiling gesture. The computer graphics system 402 analyzes the received content stream to determine if a gesture performed by the user in a frame of the content stream corresponds to a smiling gesture and identifies the particular frame in which the user performs the smiling gesture in response to determining that a gesture performed by the user corresponds to the smiling gesture.

In some embodiments, the computer graphics application 440 causes the computer graphics system 402 to identify gestures in the content stream and the corresponding frame by analyzing audio data associated with the content stream (e.g., audio data obtained or received in block 502). As an example, the computer graphics system 402 analyzes the audio data and determines or identifies a frame of the content stream that is aligned with each phoneme or phone of the word "Hello" such as, for example, a frame aligned with the "L" sound.

In some embodiments, the computer graphics system 402 receives or obtains the content stream from a camera device of the computing device 404 or the user device 410 and user input indicating a frame in which the user of the computing device 404 or the user device 410 is performing a particular gesture. For instance, the computer graphics system 402 receives a video stream from the camera device and the user is performing a frowning gesture and the user provides user input indicating the frame of the content stream in which the user is performing the frowning gesture (e.g., by providing user input to capture the particular frame).

In block 504, the various frames (e.g., the frames or images identified in block 502) are separated into various individual layers. In some embodiments, the computer graphics application 440 causes the computer graphics system 402 to separate the various frames into various individual layers. For example, the computer graphics application 440 causes the computer graphics system 402 to identify a first frame in which the character is making a smiling gesture and a second frame in which the character is making a frowning gesture and separates each frame into an individual layer.

In block 506, a face of the character is extracted from the various individual layers. In some embodiments, the computer graphics application 440 causes the computer graphics system 402 to extract or identify the face of the character from the various individual layers.

Figure 21:
FIG. 21 depicts an example of identified features of a character that can be used to generate a layered animatable puppet, in accordance with one or more embodiments.

For example, the computer graphics application 440 causes the computer graphics system 402 to identify or extract the character's face by identifying various regions or features of the character's face. In some examples, the computer graphics application 440 causes the computer graphics system 402 to identify a location or position of the various regions or features of the character's face. As an example, the computer graphics system 402 identifies the character's features including, for example, the character's eyes, mouth, nose, eyebrow, lips, oral cavity, skin, ears, chin, etc., and a corresponding location or position of the character's identified features. For example, FIG. 21 depicts an example of identified features of a character that can be used to generate a layered animatable puppet, in accordance with one or more embodiments. In the example depicted in FIG. 21, the computer graphics application 440 causes the computer graphics system 402 to identify the character's eyebrows, lips, nose, eyes, chin, jaw line, etc.

Figure 22:
FIG. 22 depicts an example of a mask of one or more features of a character that can be generated or created for generating a layered animatable puppet, in accordance with one or more embodiments.

Returning to FIG. 5, in some embodiments, in block 506, the computer graphics application 440 causes the computer graphics system 402 to identify or extract one or more features of the character by creating a mask or soft mask of the one or more features of the character and identifying the one or more features based on the mask or the soft mask. As an example, the computer graphics system 402 creates a head soft mask of the character to identify or extract the character's head. In some examples, creating a mask can involve applying a mask to a layer of an image or frame that includes a feature of the character and controlling a transparency of the mask. In some examples, controlling the transparency of the mask can create, indicate or reveal a boundary or portion (e.g., a visible boundary or portion) of the feature or layer of the image. For example, FIG. 22 depicts an example of a mask of one or more features of a character that can be generated or created for generating a layered animatable puppet, in accordance with one or more embodiments. In the example depicted in FIG. 22, the computer graphics application 440 causes the computer graphics system 402 to create a face or head soft mask of the character to identify or extract the character's head or face.

Returning to FIG. 5, in block 508, various augmented layers are generated using the individual layers (e.g., the individual layers created in block 504). In some embodiments, the computer graphics application 440 causes the computer graphics system 402 to perform one or more augmentation operations on an individual layer to generate an augmented layer.

Figure 23:
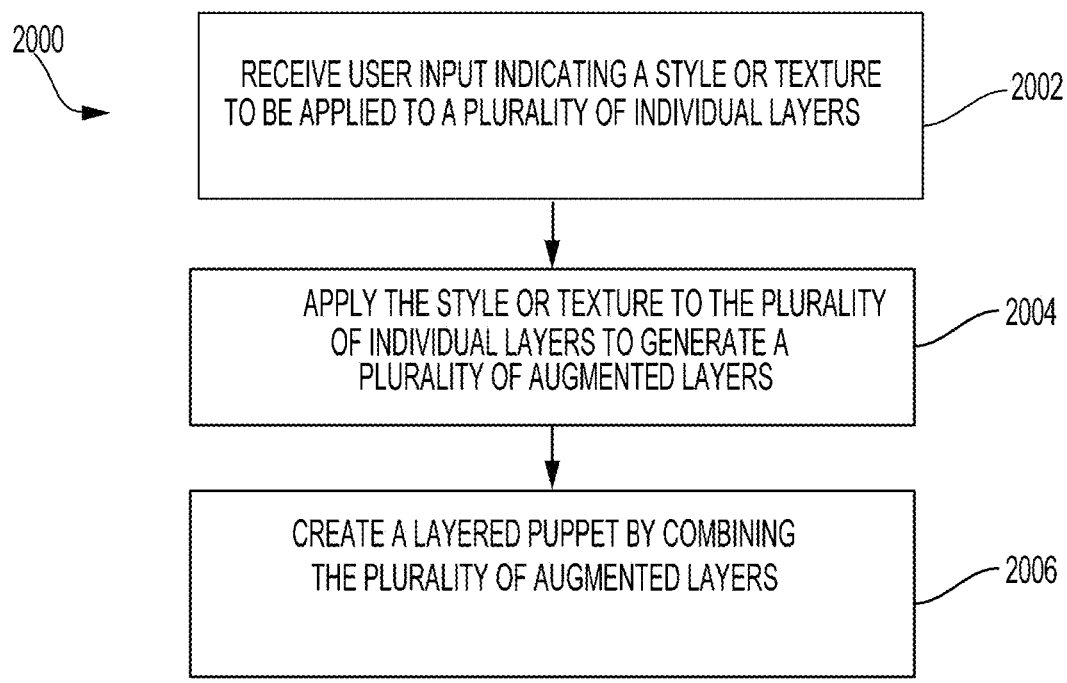
FIG. 23 is depicts an example of a process for generating various augmented layers using various individual layers, in accordance with one or more embodiments.

For example, FIG. 23 is depicts an example of a process 500 for generating various augmented layers using various individual layers, in accordance with one or more embodiments.

In block 5002, user input indicating a style or texture to be applied to various individual layers to stylize the individual layers is received (e.g., the individual layers created in block 504 of FIG. 5). In some embodiments, the computer graphics application 440 causes the computer graphics system 402 to receive the user input indicating a command to apply a particular artistic style or texture to each individual layer (e.g., the layer in which the character is making a smiling gesture and the layer in which the character is making a frowning gesture).

Figure 24:
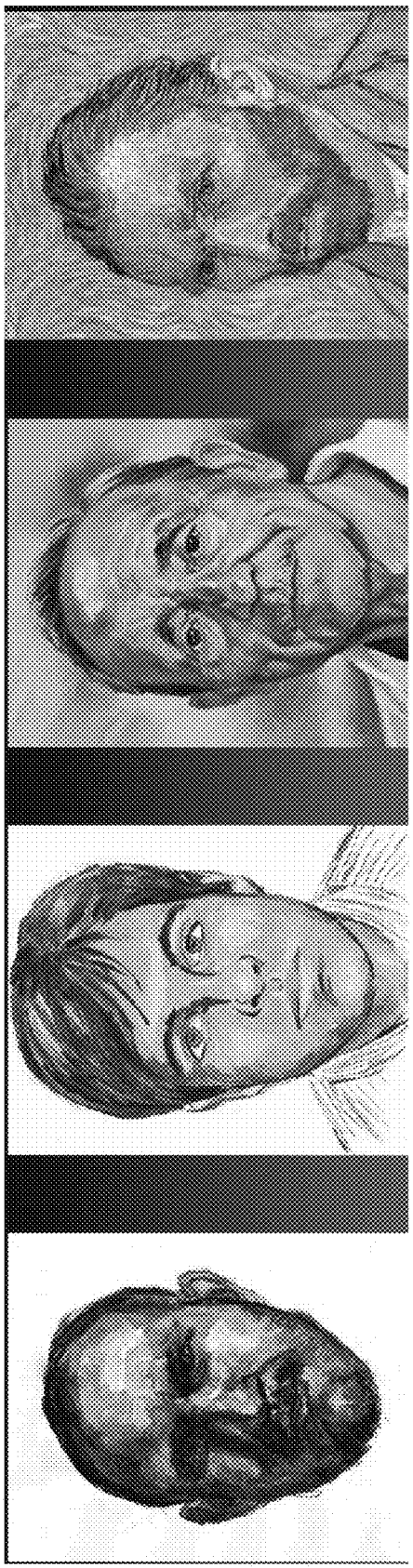
FIG. 24 depicts various augmented or stylized layers using various individual layers, in accordance with one or more embodiments.

In block 5004, the style or texture is applied to the various individual layers to generate various augmented layers. In some embodiments, the computer graphics application 440 causes the computer graphics system 402 to apply the style or texture to each individual layer to generate various stylized layers. As an example, the computer graphics system 402 receives user input indicating a command to apply a watercolor style or texture to a first layer in which the character is making a smiling gesture and a second layer in which the character is making a frowning gesture (e.g., in block 5002) and the computer graphics system 402 generates a first stylized layer that includes the character making the smiling gesture and depicted as a watercolor drawing and a second stylized layer that includes the character making the frowning gesture and depicted as a watercolor drawing. In this example, the first and second stylized layers can represent augmented layers. In some examples, the computer graphics application 440 causes the computer graphics system 402 to stylize one or more layers using various techniques or methods. An example of an algorithm that can be used by the computer graphics system 402 to stylize one or more layers, frames, or images is described in U.S. patent application Ser. No. 15/784,415, filed Oct. 16, 2017, and entitled "Generating a Stylized Image or Stylized Animation by Matching Semantic Features Via an Appearance Guide, a Segmentation Guide, and a Positional Guide," the entirety of which is incorporated by reference herein. For example, FIG. 24 depicts various augmented or stylized layers using various individual layers, in accordance with one or more embodiments.

Returning to FIG. 23, in block 5006, a layered puppet is created by combining the various augmented layers. In some examples and as described in further detail below with respect to FIG. 2, the computer graphics application 440 can cause the computer graphics system 402 to create the layered puppet by combining the various augmented or stylized layers.

Figure 25:
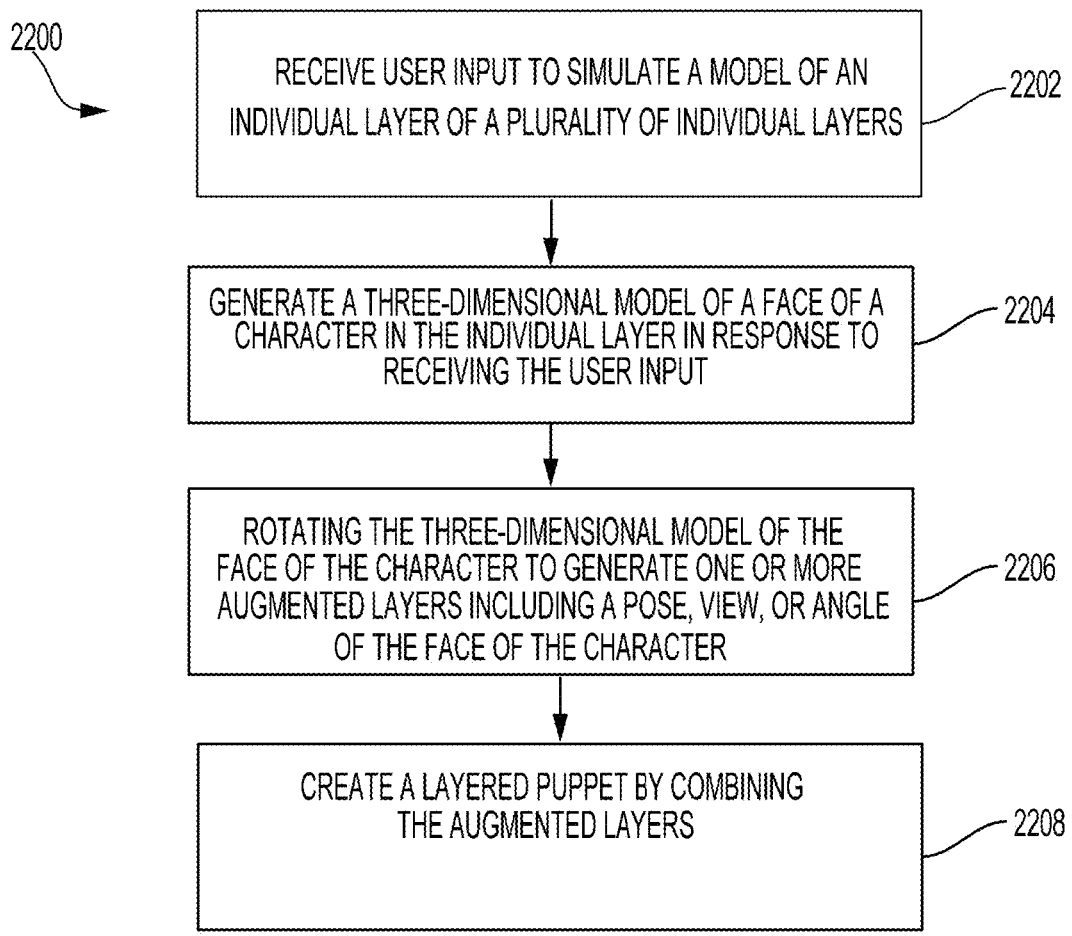
FIG. 25 is depicts another example of a process for generating various augmented layers using various individual layers, in accordance with one or more embodiments.

FIG. 25 is depicts another example of a process 2200 for generating various augmented layers using various individual layers, in accordance with one or more embodiments.

In block 2202, user input indicating a command to simulate or synthesize a model of an individual layer of a plurality of individual layers is received (e.g., the individual layers created in block 504 of FIG. 5). In some embodiments, the computer graphics application 440 causes the computer graphics system 402 to receive the user input indicating a command to simulate or synthesize a model (e.g., a three-dimensional model) of a layer of the plurality of individual layers (e.g., the layer in which the character is making a smiling gesture).

In block 2204, a three-dimensional model of a face of a character in the individual layer is generated in response to receiving the user input (e.g., in block 2202). In some embodiments, the computer graphics application 440 causes the computer graphics system 402 to generate the three-dimensional model of the face of the character in the individual model.

In block 2206, the three-dimensional model of the face of the character is rotated to generate one or more augmented layers including a pose, view, or angle of the face of the character in response to receiving the user input. In some embodiments, the computer graphics application 440 causes the computer graphics system 402 to rotate the three-dimensional model of the face of the character to generate the various augmented layers.

For example, the computer graphics system 402 receives user input indicating a command to simulate or synthesize a three-dimensional model of an individual layer (e.g., in block 2202) and the computer graphics system 402 generates one or more augmented layers by simulating or synthesizing various poses, views, angles, etc. of the character in the individual layer. For instance, a layer includes an image of the character facing forward and the computer graphics system 402 simulates or generates an augmented layer that includes an image of the character turned to right. In some examples, the computer graphics application 440 causes the computer graphics system 402 to simulate or synthesize various poses, views, angles, etc. of the character using various methods or techniques. As an example, the computer graphics system 402 generates the various poses, views, angles, etc. of the character by determining or generating a three-dimensional model of the character's face, detecting one or more textures of the character's face, and rotating the three-dimensional model to generate one or more poses, views, angles, etc. of the character. In this example, one or more of the augmented layers can include one or more of the generated views, poses, angles, etc. of the character's face.

In block 2208, a layered puppet is created by combining the various augmented layers. In some examples and as described in further detail below with respect to FIG. 5, the computer graphics application 440 can cause the computer graphics system 402 to create the layered puppet by combining the various augmented layers.

Figure 26:
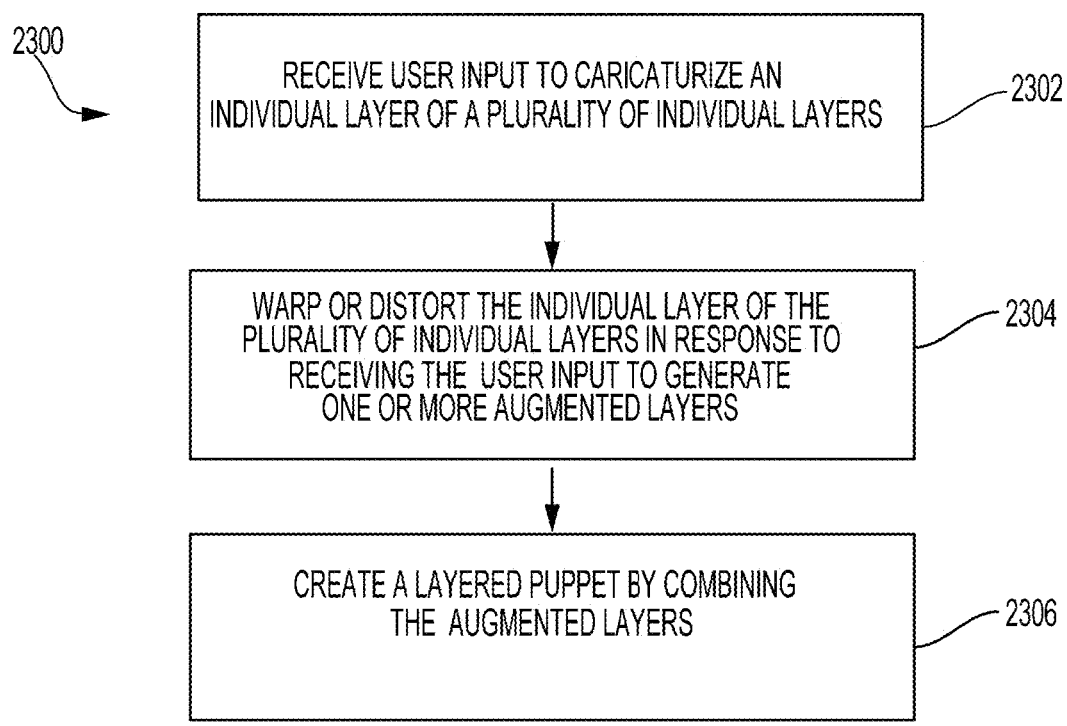
FIG. 26 is depicts another example of a process for generating various augmented layers using various individual layers, in accordance with one or more embodiments.

FIG. 26 depicts another example of a process 2300 for generating various augmented layers using various individual layers, in accordance with one or more embodiments.

In block 2302, user input indicating a command to caricaturize one or more individual layers of a plurality of individual layers is received (e.g., the individual layers created in block 504 of FIG. 5). In some embodiments, the computer graphics application 440 causes the computer graphics system 402 to receive the user input indicating the command to caricaturize an individual layer of the plurality of individual layers.

In block 2304, the individual layer is warped or distorted in response to receiving the user input to generate one or more augmented layers. In some embodiments, the computer graphics application 440 causes the computer graphics system 402 to warp, distort, or otherwise modify the individual layer to generate the various augmented layers.

For example, a layer includes an image of the character and the computer graphics system 402 receives user input to caricaturize the layer. In this example, the computer graphics system 402 generates an augmented layer by automatically caricaturizing the character by warping or distorting a feature of the character (e.g., warping or distorting the character's eyes, nose, etc.) in response to receiving a command to caricaturize the layer. In some examples, the computer graphics application 440 causes the computer graphics system 402 to caricaturize one or more layers using various methods or techniques. As an example, the computer graphics system 402 analyzes a layer and identifies one or more features of the character in the layer. The computer graphics system 402 determines a characteristic of the one or more features and modifies the one or more features based on the characteristic. For instance, the computer graphics system 402 identifies the eyes of the character in a layer and analyzes the character's eyes to determine a distance between the character's eyes or a shape of the character's eyes. In this example, the computer graphics system 402 can generate an augmented layer in response to receiving user input indicating a command to caricaturize the layer by warping or distorting the distance between the character's eyes or the shape of the character's eyes.

In block 2306, a layered puppet is created by combining the various augmented layers. In some examples and as described in further detail below with respect to FIG. 5, the computer graphics application 440 can cause the computer graphics system 402 to create the layered puppet by combining the various augmented layers.

Returning to FIG. 5, in block 510, a layered puppet is created by combining the individual layers (e.g., the individual layers created in block 504) or the various augmented layers (e.g., the augmented layers generated in block 508) and using the face of the character (e.g., the face of the character extracted in block 506). In some embodiments, the computer graphics application 440 causes the computer graphics system 402 to create the layered puppet by combining the individual layers or the various augmented layers and using the face of the character.

For example, the computer graphics application 440 causes the computer graphics system 402 to automatically generate a layered puppet by combining a first layer in which the character is making a smiling gesture and a second layer in which the character is making a frowning gesture. As another example, the computer graphics application 440 causes the computer graphics system 402 to automatically generate a layered puppet by combining a first augmented layer in which the character is making a smiling gesture and a second augmented layer in which the character is making a frowning gesture.

In block 512, the layered puppet is output for animation to perform a gesture of the various gestures. In some embodiments, the computer graphics application 440 causes the computer graphics system 402 to generate one or more user interfaces for outputting the layered puppet. In another embodiment, the computer graphics application 440 causes the computer graphics system 402 to output the layered puppet for storage (e.g., in a database).

In some embodiments, outputting the layered puppet can involve animating the layered puppet and outputting the animated layered puppet via a user interface. In this example, the computer graphics application 440 causes the computer graphics system 402 to combine the various individual layers (e.g., the individual layers created in block 508) or the various augmented layers (e.g., the augmented layers generated in block 510) to automatically generate a layered puppet that can be animated to perform gestures that resemble the various gestures performed by the character in the content stream. As an example, the computer graphics system 402 identifies a first frame in the content stream in which the character is performing a smiling gesture and a second frame in which the character is performing a frowning gesture and separates each frame into a first layer and second layer. The computer graphics system 402 can augment (e.g., stylize) the first and second layers to generate a first augmented layer and a second augmented layer and combine the first and second augmented layers to generate a layered augmented puppet. The computer graphics system 402 can animate the layered augmented puppet and output the layered augmented puppet such that the layered augmented puppet performs one or more gestures that can be perceived as the animated puppet frowning or smiling.

As another example, the computer graphics system 402 analyzes audio data associated with the content stream and determines a sound, phoneme, phone, etc. that the character is making or saying in a particular image or frame (e.g., in block 502). As an example, the computer graphics system 402 analyzes the audio data and determines or identifies a frame of the content stream that is aligned with each phoneme or phone of the word "Hello" such as, for example, a frame aligned with the "L" sound. In this example, the computer graphics system 402 can separate the identified frame into an individual layer and augment the layer in substantially the same manner as described above (e.g., stylize the layer). Continuing with this example, the computer graphics system 402 can use the augmented layer to generate a layered augmented puppet and output the layered augmented puppet such that the layered augmented puppet, when animated, can be perceived as making the "L" phoneme or phone when the letter "L" in the word "Hello" is said by the puppet (e.g., by outputting the particular augmented layer when the puppet is making the "L" sound).

In some embodiments, one or more operations described above with respect to FIG. 5 can be used to generate an animation or video (e.g., an animated puppet or a video that includes an animated puppet). In this example, the computer graphics application 440 causes the computer graphics system 402 to generate a temporal guide for generating the animation or video. The computer graphics system 402 can use the temporal guide to control an amount of temporal flickering in the animation or video. For example, the computer graphics system 402 can generate a temporal guide that can be used to generate an animation or video that preserves an appearance of a sequence of images, frames, or layers having a particular artistic style or texture that can exhibit a certain amount of temporal flickering. In some embodiments, the computer graphics system 402 uses the temporal guide to determine an amount of temporal flickering for a video or animation and controls the temporal flickering in the animation or video based on the determined amount such that the animation or video preserves an appearance of a sequence of hand-drawn images or frames and exhibits a certain amount of temporal flickering. In some embodiments, the computer graphics system 402 uses the temporal guide to determine an amount of temporal flickering for a video or animation and controls the temporal flickering in the animation or video based on the determined amount such that the animation or video includes one or more frames, images, or layers that include a layered animated puppet performing a gesture that closely mimics a neutral gesture or position of the character and also exhibits a certain amount of temporal flickering among various poses or gestures performed by the layered animated puppet. For instance, the computer graphics system 402 can create various individual layers as described above and each layer can include a character performing one or more gestures. In this example, the computer graphics system 402 can generate one or more stylized layers in which the character is in a neutral position (e.g., sitting still) and one or more stylized layers in which the character is performing various gestures. The computer graphics system 402 can generate a layered puppet using the various stylized layers. The computer graphics system 402 can use the layered puppet to create a video or animation and use the temporal guide to control the amount of temporal flickering among stylized layers in which the layered puppet is in a neutral position and stylized layers in which the layered puppet is performing various gestures.

In some examples, the computer graphics system 402 can generate the temporal guide by advecting an individual layer (e.g., an individual layer created in block 504) or an augmented layer (e.g., an augmented layer generated in block 508) using an underlying motion field. The computer graphics system 402 can then generate the temporal guide by blurring the advected layer or advected augmented layer used to create an animation or video. In this example, the computer graphics system 402 can use the generated temporal guide to generate a video or animation that preserves an appearance of a sequence of images, frames, or layers having a particular artistic style or texture that can exhibit a certain amount of temporal flickering. In some embodiments, the computer graphics system 402 uses the temporal guide to control the amount of temporal flickering in the sequence of images, frames, or layers by varying the amount of blur of the advected layer or advected augmented layer.

System Implementation Example

Figure 27:
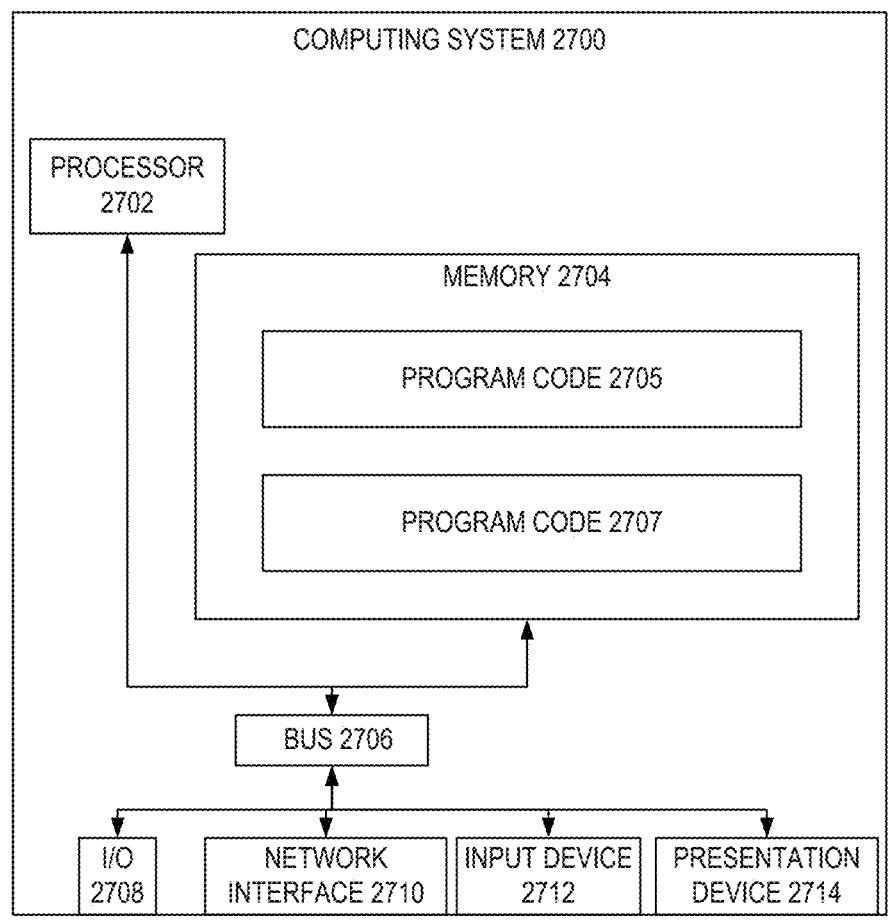
FIG. 27 is an example of a block diagram of a computing device that executes a computer graphics system to generate a layered animatable puppet using a content stream, in accordance with one or more embodiments.

Any suitable computing system or group of computing systems can be used for performing the operations described herein. FIG. 27 is an example of a block diagram of a computing system 2700. The computing system 2700 can be, for example, a computing device 404.

In some embodiments, the computing system 2700 includes a processing device 2702 that executes program code 2705, a memory device 2704 that stores various program data 2707 computed or used by operations in the program code 2705, one or more input devices 2712, and a presentation device 2714 that displays graphical content generated by executing the program code 2705. For illustrative purposes, FIG. 27 depicts a single computing system on which the program code 2705 is executed, the program data 2707 is stored, and the input devices 2712 and presentation device 2714 are present. But various applications, datasets, and devices described can be stored or included across different computing systems having devices similar to the devices depicted in FIG. 27.

The depicted example of a computing system 2700 includes a processing device 2702 communicatively coupled to one or more memory devices 2704. The processing device 2702 executes computer-executable program code stored in a memory device 2704, accesses information stored in the memory device 2704, or both. Examples of the processing device 2702 include a microprocessor, an application-specific integrated circuit ("ASIC"), a field-programmable gate array ("FPGA"), or any other suitable processing device. The processing device 2702 can include any number of processing devices, including a single processing device.

The memory device 2704 includes any suitable non-transitory computer-readable medium for storing data, program code, or both. A computer-readable medium can include any electronic, optical, magnetic, or other storage device capable of providing a processor with computer-readable instructions or other program code 2705. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 2705 may include processor-specific instructions generated by a compiler or an interpreter from code written in any suitable computer-programming language, including, for example, C, C++, C #, Visual Basic, Java, Python, Perl, JavaScript, and ActionScript.

The computing system 2700 may also include a number of external or internal devices, such as an input device 2712, a presentation device 2714, or other input or output devices. For example, the computing system 2700 is shown with one or more input/output ("I/O") interfaces 2708. An I/O interface 2708 can receive input from input devices or provide output to output devices. One or more buses 2706 are also included in the computing system 2700. The bus 2706 communicatively couples one or more components of a respective one of the computing system 2700.

The computing system 2700 executes program code that configures the processing device 2702 to perform one or more of the operations described herein. The program code includes, for example, the viseme detection engine 102, the puppet generation engine 130, or other suitable applications that perform one or more operations described herein. The program code may be resident in the memory device 2704 or any suitable computer-readable medium and may be executed by the processing device 2702 or any other suitable processor. The program code 2705 uses or generates program data 2707, such as an input recording 104, a reference audio dataset 118, a set of viseme frames 124, or other data elements or sets described herein with respect to FIGS. 1-26.

In some embodiments, the computing system 2700 also includes a network interface device 2710. The network interface device 2710 includes any device or group of devices suitable for establishing a wired or wireless data connection to one or more data networks. Non-limiting examples of the network interface device 2710 include an Ethernet network adapter, a modem, and/or the like. The computing system 2700 is able to communicate with one or more other computing devices (e.g., a computing device that receives inputs for the computer graphics system 402 or displays outputs of the computer graphics system 402) via a data network using the network interface device 2710.

An input device 2712 can include any device or group of devices suitable for receiving visual, auditory, or other suitable input that controls or affects the operations of the processing device 2702. Non-limiting examples of the input device 2712 include a recording device, a touchscreen, a mouse, a keyboard, a microphone, a video camera, a separate mobile computing device, etc. A presentation device 2714 can include any device or group of devices suitable for providing visual, auditory, or other suitable sensory output. Non-limiting examples of the presentation device 2714 include a touchscreen, a monitor, a separate mobile computing device, etc.

Although FIG. 27 depicts the input device 2712 and the presentation device 2714 as being local to the computing device that executes the program code 2705, other implementations are possible. For instance, in some embodiments, one or more of the input device 2712 and the presentation device 2714 can include a remote client-computing device that communicates with the computing system 2700 via the network interface device 2710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes one or more processing devices performing operations comprising:
    accessing video frames depicting a person performing gestures for generating a layered puppet, wherein the gestures performed in the video frames include a target viseme;
    identifying a video frame, in the video frames, that depicts the target viseme, wherein the target viseme corresponds to a target sound or phoneme, and wherein identifying the video frame comprises:
        accessing a reference audio dataset comprising reference sounds or phonemes, wherein the reference audio dataset is annotated to identify the reference sounds or phonemes;
        identifying, in the reference audio dataset, a reference audio portion corresponding to the target sound or phoneme that corresponds to the target viseme;
        comparing the reference audio portion to an input audio dataset corresponding to the video frames to identify a matching audio portion in the input audio dataset that matches the reference audio portion corresponding to the target sound or phoneme that corresponds to the target viseme; and
        identifying the video frame based on determining that the video frame has a video timestamp matching an audio timestamp of the matching audio portion that matches the reference audio portion that corresponds to the target sound or phoneme that corresponds to the target viseme;
    creating, from at least some of the video frames, a puppet animation of the gestures, wherein the puppet animation of the gestures includes a target puppet animation of the target viseme corresponding to the target sound or phoneme, and wherein the target puppet animation is generated from the video frame; and
    outputting, via a presentation device, the puppet animation.

2. The method of claim 1, wherein identifying the matching audio portion that matches the reference audio portion comprises applying a dynamic time warping operation to the input audio dataset and the reference audio dataset to determine a modification, the modification being based on the dynamic time warping operation and useable to modify a block of the input audio dataset or the reference audio dataset to align the block of the input audio dataset with the block of the reference audio dataset.

3. The method of claim 2, wherein identifying the matching audio portion that matches the reference audio portion further comprises:
    modifying the matching audio data according to the modification based on the dynamic time warping operation to align the matching audio portion to the reference audio portion; and
    matching the matching audio portion, as modified, with the reference audio portion.

4. The method of claim 1, wherein accessing the reference audio dataset comprises:
    applying a scoring operation that generates a plurality of suitability scores for a plurality of reference audio datasets, respectively, wherein the scoring operation generates a first suitability score for the reference audio dataset and a second suitability score for an additional reference audio dataset; and
    selecting the reference audio dataset from the plurality of reference audio datasets based on a comparison of the first suitability score to the second suitability score, wherein the comparison indicates that the reference audio dataset matches one or more attributes of the input audio dataset more closely than the additional reference audio dataset.

5. The method of claim 4, wherein the scoring operation comprises:
    computing, for the input audio dataset and the reference audio dataset, a first array of squash/stretch values by applying a dynamic time warping operation to the input audio dataset and the reference audio dataset;
    computing a first error value from the first array of squash/stretch values, wherein the first error value indicates a deviation of the first array of squash/stretch values from an array of baseline squash/stretch values for the dynamic time warping operation, wherein the first suitability score includes or is derived from the first error value;

computing, for the input audio dataset and the additional reference audio dataset, a second array of squash/stretch values by applying the dynamic time warping operation to the input audio dataset and the additional reference audio dataset; and computing a second error value from the second array of squash/stretch values, wherein the second error value indicates a deviation of the second array of squash/stretch values from an array of baseline squash/stretch values for the dynamic time warping operation, wherein the second suitability score includes or is derived from the second error value.

6. The method of claim 5, wherein computing a particular error value of the first error value and the second error value from a particular array of the first array and the second array comprises:

replacing a particular squash value in the particular array with a distance value that is a multiplicative inverse of the particular squash value; and computing, as an error value for the particular array, a root mean square error between an array of baseline distance values and the particular array in which the distance value has replaced the particular squash value.

7. The method of claim 4, wherein the scoring operation comprises comparing an input set of pitches from the input audio dataset and each of a plurality of reference sets of pitches from the plurality of reference audio datasets, respectively, wherein a particular suitability score indicates a similarity between the input set of pitches and a particular reference set of pitches.

8. The method of claim 1, the operations further comprising:

identifying candidate video frames from the video frames;

determining, from an image analysis of the candidate video frames, that a first candidate video frame has a first probability of depicting the person speaking the target sound or phoneme and that a second candidate video frame has a second probability of depicting the person speaking the target sound or phoneme; and selecting the first candidate video frame as the video frame based on the first probability being greater than the second probability, wherein the video frame is tagged based on the video frame being selected from the candidate video frames.

9. The method of claim 1, the operations further comprising:

identifying, from a comparison of the input audio dataset with the reference audio dataset, a first set of timestamps at which the target sound or phoneme is present in the input audio dataset;

identifying, from an image analysis of the video frames, a second set of timestamps at which the target sound or phoneme is present in the input audio dataset, wherein the second set of timestamps includes one or more timestamps absent from the first set of timestamps; and selecting the video frame based on a particular timestamp of the video frame being in the first set of timestamps and the second set of timestamps.

10. A system comprising:

one or more processing devices; and a non-transitory computer-readable medium communicatively coupled to the one or more processing devices and storing instructions, wherein the one or more processing devices are configured to execute the instructions and thereby perform operations comprising:

accessing video frames depicting a person performing gestures for generating a layered puppet, wherein the gestures performed in the video frames include a target viseme;

identifying a video frame, in the video frames, that depicts the target viseme, wherein the target viseme corresponds to a target sound or phoneme, and wherein identifying the video frame comprises:

accessing a reference audio dataset comprising reference sounds or phonemes, wherein the reference audio dataset is annotated to identify the reference sounds or phonemes;

identifying, in the reference audio dataset, a reference audio portion corresponding to the target sound or phoneme that corresponds to the target viseme;

comparing the reference audio portion to an input audio dataset corresponding to the video frames to identify a matching audio portion in the input audio dataset that matches the reference audio portion corresponding to the target sound or phoneme that corresponds to the target viseme; and identifying the video frame based on determining that the video frame has a video timestamp matching an audio timestamp of the matching audio portion that matches the reference audio portion that corresponds to the target sound or phoneme that corresponds to the target viseme;

creating, from at least some of the video frames, a puppet animation of the gestures, wherein the puppet animation of the gestures includes a target puppet animation of the target viseme corresponding to the target sound or phoneme, and wherein the target puppet animation is generated from the video frame; and outputting, via a presentation device, the puppet animation.

11. The system of claim 10, wherein accessing the reference audio dataset comprises:

applying a scoring operation that generates a plurality of suitability scores for a plurality of reference audio datasets, respectively, wherein the scoring operation generates a first suitability score for the reference audio dataset and a second suitability score for an additional reference audio dataset; and selecting the reference audio dataset from the plurality of reference audio datasets based on a comparison of the first suitability score to the second suitability score, wherein the comparison indicates that the reference audio dataset matches one or more attributes of the input audio dataset more closely than the additional reference audio dataset.

12. The system of claim 11, wherein the scoring operation comprises:

computing, for the input audio dataset and the reference audio dataset, a first array of squash/stretch values by applying a dynamic time warping operation to the input audio dataset and the reference audio dataset;

computing a first error value from the first array of squash/stretch values, wherein the first error value indicates a deviation of the first array of squash/stretch values from an array of baseline squash/stretch values for the dynamic time warping operation, wherein the first suitability score includes or is derived from the first error value;
computing, for the input audio dataset and the additional reference audio dataset, a second array of squash/stretch values by applying the dynamic time warping operation to the input audio dataset and the additional reference audio dataset; and
computing a second error value from the second array of squash/stretch values, wherein the second error value indicates a deviation of the second array of squash/stretch values from an array of baseline squash/stretch values for the dynamic time warping operation, wherein the second suitability score includes or is derived from the second error value,
wherein computing a particular error value of the first error value and the second error value from a particular array of the first array and the second array comprises:
replacing a particular squash value in the particular array with a distance value that is a multiplicative inverse of the particular squash value; and
computing, as an error value for the particular array, a root mean square error between an array of baseline distance values and the particular array in which the distance value has replaced the particular squash value.

13. The system of claim 10, the operations further comprising:
identifying candidate video frames from the video frames;
determining, from an image analysis of the candidate video frames, that a first candidate video frame has a first probability of depicting the person speaking the target sound or phoneme and that a second candidate video frame has a second probability of depicting the person speaking the target sound or phoneme; and
selecting the first candidate video frame as the video frame based on the first probability being greater than the second probability, wherein the video frame is tagged based on the video frame being selected from the candidate video frames.

14. The system of claim 10, the operations further comprising:
identifying, from a comparison of the input audio dataset with the reference audio dataset, a first set of timestamps at which the target sound or phoneme is present in the input audio dataset;
identifying, from an image analysis of the video frames, a second set of timestamps at which the target sound or phoneme is present in the input audio dataset, wherein the second set of timestamps includes one or more timestamps absent from the first set of timestamps; and
selecting the video frame based on a particular timestamp of the video frame being in the first set of timestamps and the second set of timestamps.

15. The system of claim 10, wherein identifying the matching audio portion that matches the reference audio portion comprises:
applying a dynamic time warping operation to the input audio dataset and the reference audio dataset to determine a modification, the modification being based on the dynamic time warping operation and useable to modify a block of the input audio dataset or the reference audio dataset to align the block of the input audio dataset with the block of the reference audio dataset;
modifying the matching audio data according to the modification based on the dynamic time warping operation to align the matching audio portion to the reference audio portion; and
matching the matching audio portion, as modified, with the reference audio portion.

16. A non-transitory computer-readable medium having program code stored thereon that, when executed by one or more processing devices, causes the one or more processing devices to perform operations comprising:
accessing video frames depicting a person performing gestures for generating a layered puppet, wherein the gestures performed in the video frames include a target viseme;
identifying a video frame, in the video frames, that depicts the target viseme, wherein the target viseme corresponds to a target sound or phoneme, and wherein identifying the video frame comprises:
accessing a reference audio dataset comprising reference sounds or phonemes, wherein the reference audio dataset is annotated to identify the reference sounds or phonemes;
identifying, in the reference audio dataset, a reference audio portion corresponding to the target sound or phoneme that corresponds to the target viseme;
comparing the reference audio portion to an input audio dataset corresponding to the video frames to identify a matching audio portion in the input audio dataset that matches the reference audio portion corresponding to the target sound or phoneme that corresponds to the target viseme; and
identifying the video frame based on determining that the video frame has a video timestamp matching an audio timestamp of the matching audio portion that matches the reference audio portion that corresponds to the target sound or phoneme that corresponds to the target viseme;
creating, from at least some of the video frames, a puppet animation of the gestures, wherein the puppet animation of the gestures includes a target puppet animation of the target viseme corresponding to the target sound or phoneme, and wherein the target puppet animation is generated from the video frame; and
outputting, via a presentation device, the puppet animation.

17. The non-transitory computer-readable medium of claim 16, wherein accessing the reference audio dataset comprises:
applying a scoring operation that generates a plurality of suitability scores for a plurality of reference audio datasets, respectively, wherein the scoring operation generates a first suitability score for the reference audio dataset and a second suitability score for an additional reference audio dataset; and
selecting the reference audio dataset from the plurality of reference audio datasets based on a comparison of the first suitability score to the second suitability score, wherein the comparison indicates that the reference audio dataset matches one or more attributes of the input audio dataset more closely than the additional reference audio dataset,
wherein the scoring operation comprises:
computing, for the input audio dataset and the reference audio dataset, a first array of squash/stretch values by applying a dynamic time warping operation to the input audio dataset and the reference audio dataset;

computing a first error value from the first array of squash/stretch values, wherein the first error value indicates a deviation of the first array of squash/stretch values from an array of baseline squash/stretch values for the dynamic time warping operation, wherein the first suitability score includes or is derived from the first error value;

computing, for the input audio dataset and the additional reference audio dataset, a second array of squash/stretch values by applying the dynamic time warping operation to the input audio dataset and the additional reference audio dataset; and computing a second error value from the second array of squash/stretch values, wherein the second error value indicates a deviation of the second array of squash/stretch values from an array of baseline squash/stretch values for the dynamic time warping operation, wherein the second suitability score includes or is derived from the second error value, wherein computing a particular error value of the first error value and the second error value from a particular array of the first array and the second array comprises:

replacing a particular squash value in the particular array with a distance value that is a multiplicative inverse of the particular squash value; and computing, as an error value for the particular array, a root mean square error between an array of baseline distance values and the particular array in which the distance value has replaced the particular squash value.

18. The non-transitory computer-readable medium of claim 16, the operations further comprising:

identifying candidate video frames from the video frames;

determining, from an image analysis of the candidate video frames, that a first candidate video frame has a first probability of depicting the person speaking the target sound or phoneme and that a second candidate video frame has a second probability of depicting the person speaking the target sound or phoneme; and selecting the first candidate video frame as the video frame based on the first probability being greater than the second probability, wherein the video frame is tagged based on the video frame being selected from the candidate video frames.

19. The non-transitory computer-readable medium of claim 16, the operations further comprising:

identifying, from a comparison of the input audio dataset with the reference audio dataset, a first set of timestamps at which the target sound or phoneme is present in the input audio dataset;

identifying, from an image analysis of the video frames, a second set of timestamps at which the target sound or phoneme is present in the input audio dataset, wherein the second set of timestamps includes one or more timestamps absent from the first set of timestamps; and selecting the video frame based on a particular timestamp of the video frame being in the first set of timestamps and the second set of timestamps.

20. The non-transitory computer-readable medium of claim 16, wherein identifying the matching audio portion that matches the reference audio portion comprises:

applying a dynamic time warping operation to the input audio dataset and the reference audio dataset to determine a modification, the modification being based on the dynamic time warping operation and useable to modify a block of the input audio dataset or the reference audio dataset to align the block of the input audio dataset with the block of the reference audio dataset;

modifying the matching audio data according to the modification based on the time warping operation to align the matching audio portion to the reference audio portion; and matching the matching audio portion, as modified, with the reference audio portion.

* * * * *